(12) United States Patent
Llinas et al.

(10) Patent No.: US 7,822,694 B2
(45) Date of Patent: Oct. 26, 2010

(54) NEURO-MIMETIC CONTROL SYSTEMS AND METHODS

(75) Inventors: Rodolfo Llinas, New York, NY (US); Vladislav V. Papko, Nizhny Novgorod (RU); Viktor B. Kazantsev, Nizhny Novgorod (RU); Vladimir I. Nekorkin, Nizhny Novgorod (RU); Vladimir Makarenko, New York, NY (US)

(73) Assignee: New York University, New York, NY (US)

( * ) Notice: Subject to any disclaimer, the term of this patent is extended or adjusted under 35 U.S.C. 154(b) by 828 days.

(21) Appl. No.: 10/627,355

(22) Filed: Jul. 24, 2003

(65) Prior Publication Data

US 2004/0075473 A1 Apr. 22, 2004

Related U.S. Application Data

(60) Provisional application No. 60/405,191, filed on Aug. 21, 2002.

(51) Int. Cl.
*G06F 15/18* (2006.01)
(52) U.S. Cl. ...................................................... 706/14
(58) Field of Classification Search .................. 706/15, 706/12, 20, 26, 35, 23, 44; 327/100
See application file for complete search history.

(56) References Cited

U.S. PATENT DOCUMENTS 4,720,689 A * 1/1988 Gontowski, Jr. ............. 331/111

6,242,988 B1 6/2001 Sarpeshkar

FOREIGN PATENT DOCUMENTS

WO WO-9323814 11/1993

OTHER PUBLICATIONS

'Pulsed Neural Networks': Maass, Bishop, :1999, MIT, p. 59, 62-63, 66, 76, 87-91.*
'Model-based Control for Ultrasonic Motors': Maas, Schulte, Frohleke, 2000, IEEE/ASME Transactions on mechatronics, vol. 5, No. 2, Jun. 2000, pp. 165-180.*
'A computational model of four regions of the cerebellum based on feedback error learning': Kawato, 1992, Biological Cybernetics, 68, 95-103.*

(Continued)

*Primary Examiner*—Donald Sparks
*Assistant Examiner*—Peter Coughlan
(74) *Attorney, Agent, or Firm*—Foley & Lardner LLP

(57) ABSTRACT

A control system and method base on a model of a neurological structure such as the inferior olive of the brain. In one embodiment, individual inferior olive neurons are modeled in hardware, such as in an integrated circuit, and interconnected to form an artificial inferior olive. The artificial inferior olive thus formed can be used in a universal movement control system. An exemplary system for controlling the operation of a six-legged walker is described. The degree of coupling between neurons can be varied. A model is also provided which mimics the interaction between neurons of the inferior olive, the cerebellar nuclei and Purkinje cells via collateral axons. The model accurately describes the qualitative dynamics of cluster formation and spike-train generation in the olivo-cerebellar system. A universal control system (UCS) based on the olivo-cerebellar system is described.

35 Claims, 33 Drawing Sheets

Olivo-cerebellar feedback loop

OTHER PUBLICATIONS

Pulsed Neural Networks: Maass, 1998, MIT Press, pp. 55, 58-60, 63-65, 76-79, 88, 92.*
'Modeling inferior olive neuron dynamics': Velarde, Jan. 2002, Elsevier, 0893-6080, pp. 5-10.*
'Cerebellar learning for control of a two link arm in muscle space': Fagg, 1997, IEEE, 0-7803-3612-7, pp. 2638-2644.*
'Homoclinic orbits and solitary waves in a one dimensional array of chua's circuits': Nekorkin, 1995, IEEE, 1057-7122/95.*
'Microelectronic circuits': Sedra, Oxford University Press, 1998, 668-669, 714-716, 973-977.*
'Microelectronic circuits': Sedra, Jan. 8, 1998, Oxford Press, pp. 668-669, 714-716, 973-1039.*
Y. Han, et al.; "A Neural Cell Model of MSO"; IEEE 1991 Proc. 17th annual Bioengineering conf.; Apr. 1991; pp. 121-122.
W. Maass, et al.; "On the Complexity of Learning for A Spiking Neuron"; ACM 10th annual conf. Computational Learning Theory; 1997; pp. 54-61.
Williamson, Matthew, M., 1998. "Rhythmic Robot Arm Control Using Oscillators". http://dx.doi.org/10.1109/IROS.1998.724600. Retrieved Aug. 11, 2008.
Eskiizmirliler, et al., 2001. "Motor Control of a Limb Segment Actuated by Artificial Muscles". Proceedings of the 23rd Annual International Conference of the IEEE Engineering in Medicine and Biology Society (EMBS), Istanbul, Turkey, Oct. 25-28, 2001, vol. 1, pp. 865-868.
Doya, et al., 2001. "Neural Mechanisms of Learning and Control". IEEE Control Systmes Magazine 21(4): 42-54.

Linares-Barranco, et al., 1992. "CMOS Analog Neural Network Systems Based on Oscillatory Neurons". 1992 IEEE International Symposium on Circuits and Systems, vol. 5, pp. 2236-2239.
Elena Leznik, et al.; "Electrotonically Mediated Oscillatory Patterns in Neuronal Ensembles: An In Vitro Voltage-Dependent Dye-Imaging Study in the Inferior Olive"; The Journal of Neuroscience, Apr. 1, 2002, 22(7), pp. 2804-2815.
Manuel G. Velarde, et al.; "Modeling inferior olive neuron dynamics"; Neural Networks 15, (2002), 5-10.
E.J.Lang, et al.; "GABAergic Modulation of Complex Spike Activity by the Cerebellar Nucleoolivary Pathway in Rat"; Journal of Neurophysiology, vol. 76, No. 1, Jul. 1996, pp. 255-275.
John P. Welsh, et al.; "Dynamic organization of motor control within the olivocerebellar system"; Nature, vol. 374, Mar. 30, 1995, pp. 453-457.
I. Sugihara, et al; "Uniform Olivocerebellar Conduction Time Underlies Purkinje Cell Complex Spike Synchronicity in the Rat Cerebellum"; Journal of Physiology (1993), 470, pp. 243-271.
R, Llinas; "The Intrinsic Electrophysiological Properties of Mammalian Neurons: Insights into Central Nervous System Function"; Science, vol. 242, pp. 1654-1664 (1998).
R. Llinas, et al.; "Electronic Coupling Between Neurons in Cat Inferior Olive"; Journal of Neurophysiology, vol. XXXVII, No. 3, 1974, pp. 560-571.
C. Sotelo, et al.; "Structural Study of Inferior Olivary Nucleus of hte Cat: Morphological Correlates of Electronic Coupling"; Journal of Neurophysiology, vol. XXXVII, No. 3, 1974, pp. 541-559.

* cited by examiner

Olivo-cerebellar feedback loop

Functional circuit

ELECTROPHYSIOLOGY OF NEURONES
IN OSCILLATION AND RESONANCE 9

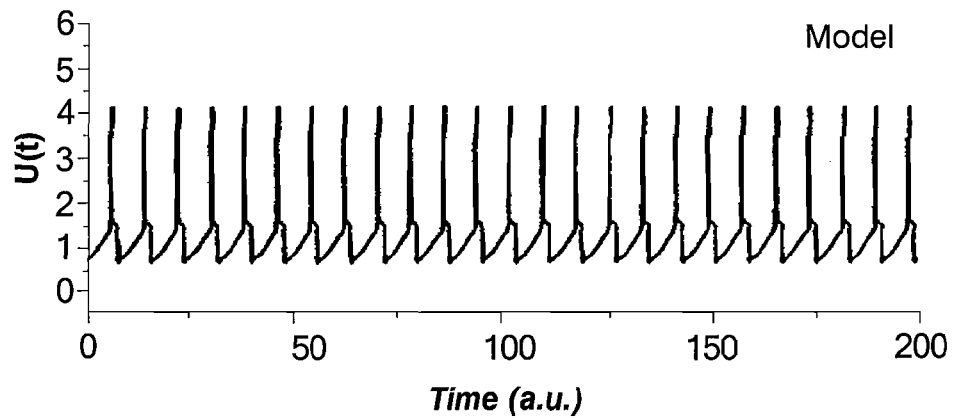
FIG. 7(a)
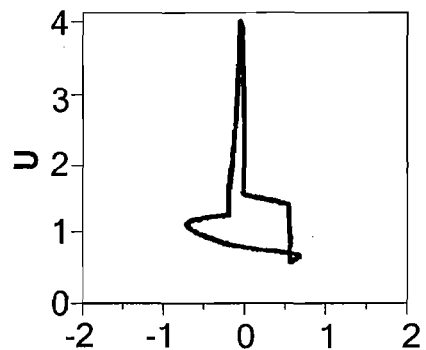
FIG. 7B
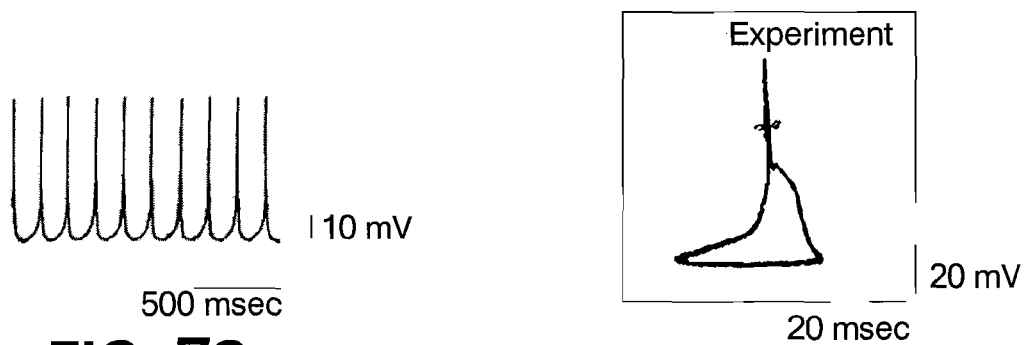
FIG. 7C
FIG. 7D

Block-Diagram of the Circuit

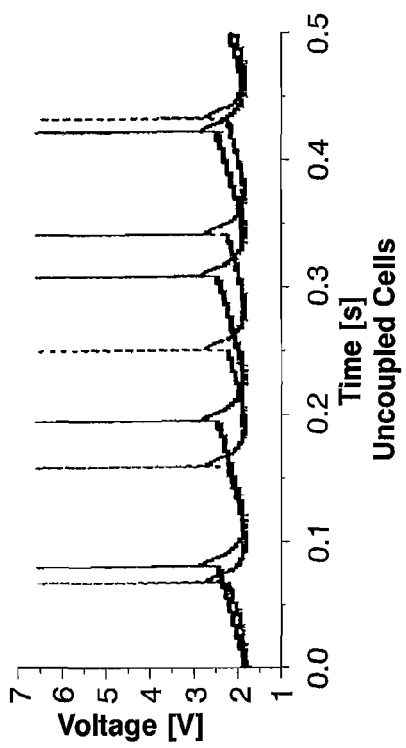
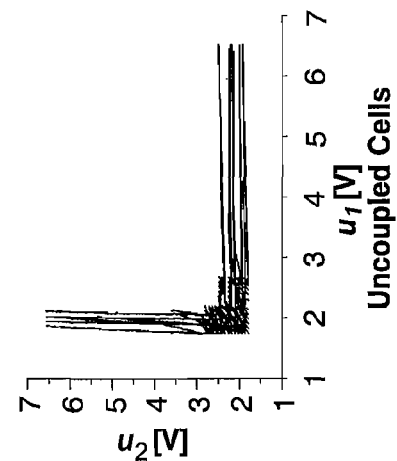
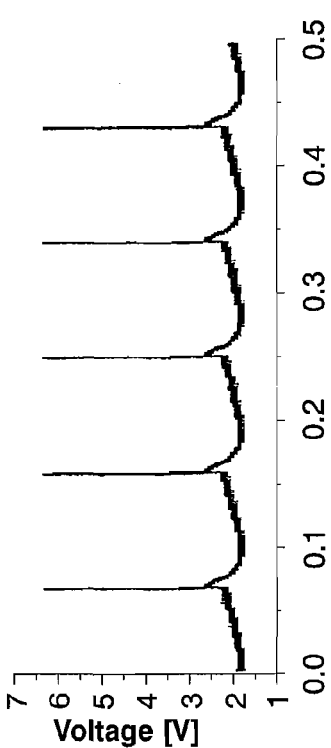
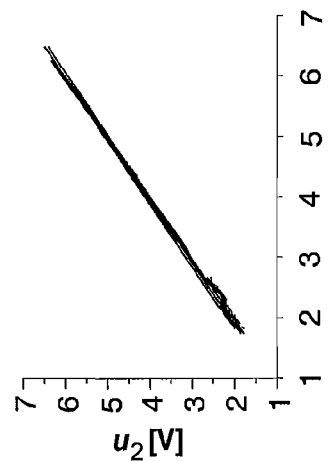
FIG. 13A  Uncoupled Cells
FIG. 13B  Uncoupled Cells
FIG. 13C  Synchronization
FIG. 13D  Synchronization Synchronous and Asynchronous Spiking Synchronous and
Asynchronous Spiking The control signal recovers
the correct phase shift relations

Coordination with Discrete Control

Coordination with Discrete Control

Coordination with Discrete Control

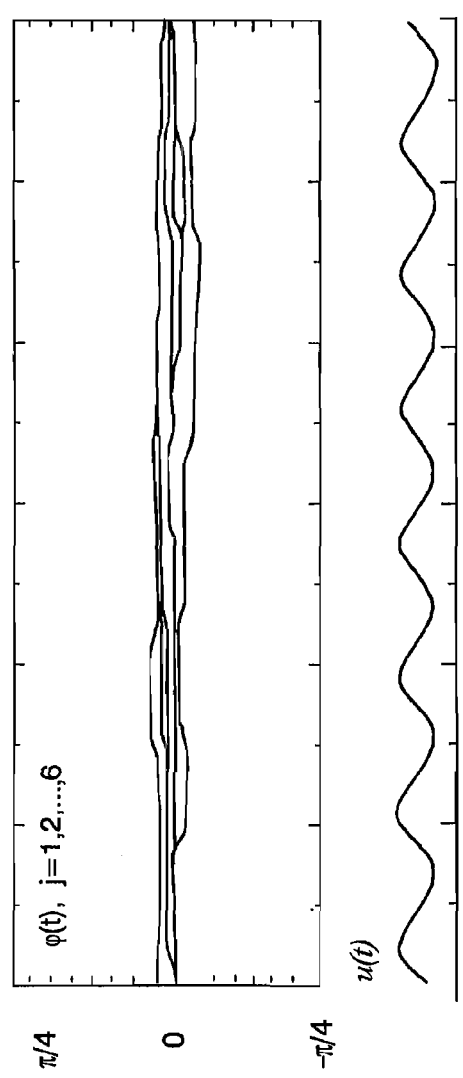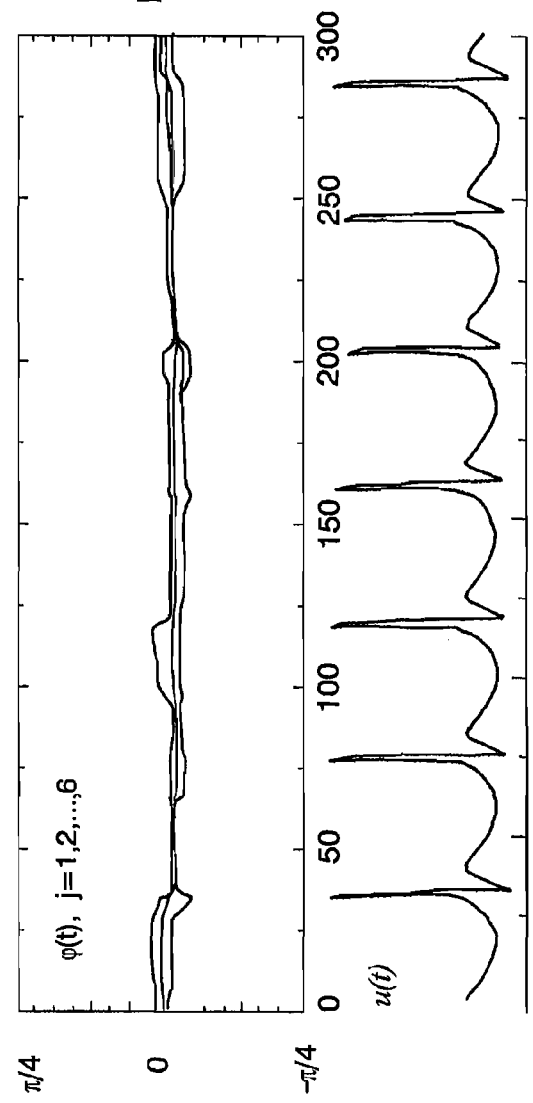
FIG. 20A No Control
FIG. 20B Discrete Control

Motor Pattern

NEURO-MIMETIC CONTROL SYSTEMS AND METHODS

This application claims the priority of U.S. Provisional Application No. 60/405,191, filed on Aug. 21, 2002 which is hereby incorporated by reference in its entirety.

FIELD OF THE INVENTION

The present invention relates to control systems and methods based on the behavior of neurological structures such as the inferior olive of the brain.

BACKGROUND INFORMATION

Since the discovery of the alpha rhythm, rhythmic activity has been experimentally observed in many parts of the central nervous systems (CNS) of living organisms. Such activity can be traced down to the single cell level where the rhythmicity is associated with membrane potential oscillations at different frequencies and subserved by different ionic mechanisms. Indeed, this kind of activity is supported by the biophysical properties of single neurons and often reinforced by their connectivity.

Various feedback and feed-forward resonance loops "linking" different parts of the CNS select a particular rhythm. An important source of input connectivity to the cerebellum is the inferior olive (IO) nucleus. The olivo-cerebellar circuit plays an important role in motor performance and the control of movement. In this circuit, the inferior olive projects excitatory signals into the Purkinje cell layer in the cerebellar cortex. In turn, the Purkinje cells send inhibitory messages to the IO via the cerebellar nuclei which also receive excitatory inputs from the IO. The inferior olive is believed to act as a quasi-digital timing device for movement coordination functions of the CNS.

FIGS. 1A-C show the main functional structures of the olivo-cerebellar circuit and their interconnectivity. The Purkinje cells (PCs) provide feed-forward inhibitory control to the cerebellar nuclei (CN). The CN have two distinct functions: 1) to provide inhibitory feed-back to IO neurons to control neuron coupling in the IO; and 2) to provide inhibitory feedback to a second set of neurons that have excitatory termination in the thalamus, the brain stem, and the upper spinal cord. This second set of neurons times motor execution. Thus, in the olivo-cerebellar circuit, the PCs modulate (via the nuclear feed-back inhibitory pathway) cluster formation in the inferior olive, and inhibit excitatory output to the rest of the brain.

The inferior olive nucleus consists of neurons that are capable of supporting rhythmic symmetric membrane potential dynamics with respect to the base line (i.e. the rest potential). These almost sinusoidal sub-threshold oscillations support spike generation when the membrane is depolarized or hyperpolarized (sodium and calcium channels, respectively). Precision and robustness of spike generation patterns primarily result from the precision and robustness of the sub-threshold oscillations.

As shown by in vitro and in vivo experiments, the behavior of IO neurons exhibits two characteristic features: (i) spontaneous sub-threshold oscillations having an amplitude of 5 to 10 mV, with a quasisinusoidal shape and a frequency of 5 to 12 Hz, as shown in FIG. 2B; and (ii) action potentials or spikes at the top of the oscillations when the threshold is exceeded, as shown in FIGS. 2A and 2C.

Presently only a few models of the IO neuron have been developed, such as the Manor, Rinzel, Yarom and Segev model and the Schweighofer, Doya and Kawato model. These models primarily address the dynamics of neuronal integration by detailed ionic conductance and passive multicompartment cable modeling. Such models may be tuned according to particular experimental conditions and may describe the behavior of the IO neuron very accurately. For purposes of a possible implementation with electronic circuitry, however, these models are quite complex involving a huge number of variables and parameters.

Another approach to modeling the IO neuron is behavior-based modeling. Examples are the FitzHugh-Nagumo two-variable model describing the propagation of action potentials and the Hind-March-Rose model providing spike-burst oscillations. Such models exhibit good qualitative agreement with actual neuron behavior and are simpler to implement electronically.

In addition to studying the behavior of individual IO neurons, significant work has been done in observing and characterizing the behavior of large numbers of interacting IO neurons, as they exist in the inferior olive. In the actual inferior olive, the neurons are coupled to each other via gap junctions. As has been observed experimentally, interactions between IO neurons is largely local; i.e., ensembles of interacting neurons tend to involve a relatively small number of neighboring neurons.

As the coupling among neurons increases, the degree of synchronization of the neurons increases. As has been experimentally observed, closely coupled IO neurons form oscillatory clusters. Influencing such synchronism and intercoupling of neurons is the olivo-cerebellar loop. Via certain pathways, the cerebellum can influence the degree of coupling among IO neurons, thereby increasing or decreasing the degree of synchronism among IO neurons. This feedback mechanism leads to the formation of patterns of neuron clusters in the IO having both a temporal and a spatial distribution.

On the one hand, IO neurons can behave as autonomous oscillators and on the other as a neuronal ensemble producing synchronous spikes. The neuron action potentials are transmitted over axons to the Purkinje Cell array (PC) and the cerebellar nuclei (CN). The CN neurons return to the IO as inhibitory terminals situated mostly on the gap junctions to implement the electrical decoupling between the IO neurons. This return pathway serves as a feedback inhibitory, decoupling signal to the IO neurons, creating conditions for multi-cluster activity.

The dendrites of the closely packed IO neurons are electrotonically coupled via dendritic gap junctions which serve to synchrone their oscillatory properties. Primary coupling occurs between 50 or so neighboring cells. In addition to activating Purkinje cells, IO spikes activate the inhibitory cerebellar nucleus loop which projects to the IO glomeruli where the gap junctions occur and produces a dynamic shunt of the electrotonic coupling. These two mechanisms lead to internal synchronization and desynchronization, which together with sensory and motor input result in the formation of spatio-temporal oscillatory activity clusters in the IO. Such clusters have been studied using voltage dependent dye imaging of the IO in vitro and have been monitored in vivo at the Purkinje cell layer with multiple electrode recordings. The time appropriate dynamics in the clusters' activity have been directly correlated with pre-motor patterns of Purkinje cell activity during motor execution.

Multi-electrode experiments with Purkinje cells in the rodent cerebellar cortex have also shown that the number of cells producing isochronous spike clusters is relatively small for spontaneous activity and increases with neuropharmacological intervention with drugs such as harmaline (hyperpolarizes further IO neurons) or picrotoxin (prevents decoupling of gap junctions). In the latter case, almost all neurons are grouped into one cluster and fire together. This reentry provides a means for an external stimulus to control the sensitivity of the loops IO-PC-CN and IO-CN. Such modulations allow the formation of well-organized patterns of global activity, which are of significance in motor coordination. The patterns evolve in time as the autonomous excitatory-inhibitory loops suitable recognize the clusters of synchronous firing neurons and prevent their uncontrolled growth. The clusters in the IO generally reorganize as the amplitudes decay with subsequent phase resetting.

It is believed that the spatio-temporal clustering of IO neurons is used to select the optimal combination of simultaneous muscular contractions to carry out coordinated movements by acting as movement execution templates. The clustering is updated at a rate of approximately 10 Hz, the frequency of sub-threshold oscillations of the IO neurons.

Operating with oscillatory space-time dynamics, the olivo-cerebellar system serves as an effective analog controller with surprisingly high computational power. Unlike a digital system, the olivo-cerebellar system does not actually perform computations, but rather deals with analog signals and represents the parameters under control as space-time patterns.

This system can provide simultaneous, on-line tuning of a large number of parameters (e.g., muscular parameters) with the precision required to execute the complex multi-jointed movements that characterize vertebrate motricity. For instance, a simple grasping movement of a hand involves the simultaneous activation of 50 key muscles with more than $10^{15}$ possible combinations of contractions. By comparison, a digital controller updating parameters every 1 ms would require a clock rate on the order of $10^6$ GHz. A digital solution would likely entail an independent processor for each muscle via a parallel digital controller. However, activation of different groups of muscles (muscle synergies) should be highly coherent and at each time step the processors would require highly precise synchronization. It is thus apparent that even simple motor tasks would result in computational overload of conventional processors.

By contrast, the olivo-cerebellar system operates with a drastically different strategy. First, in order to avoid the huge computational workload, the olivo-cerebellar system operates in a temporally discontinuous fashion. The IO operates at approximately 10 Hz, which appears as a physiological tremor and results in the discontinuity of movement. At the same time, the low timing rate demands recurrent upgrade compensation every 100 msec to smooth the movement discontinuities. As discussed, this is implemented through dynamic nucleo-cerebellar inhibitory feedback on IO oscillatory phase by changing the electrotonic coupling among IO neurons.

Movement control requires that each time step activation of different muscles or muscle synergies be highly synchronized. Accordingly, the IO neurons, which act as controller oscillators, form a set of phase clusters with spatial configuration corresponding to the muscle contraction template. Thus, the space-time evolution of the clusters controls the optimal template at the next time step. Note, that such an internal representation of the parameters under control brings a high degree of resilience to the system. Indeed, if one of the parameters (or a control unit) is damaged, the IO can rapidly rearrange cluster distribution and execute the required action.

SUMMARY OF THE INVENTION

In a first aspect of the present invention, a new model of the inferior olive neuron is provided. Based on empirically observed modes of membrane potential dynamics, the model of the present invention combines Van der Pol and FitzHugh-Nagumo (FN) dynamic systems in which each oscillator property dominates one particular mode of the cell dynamics. In accordance with the present invention, a model of the IO neuron is provided which is substantially less complex than previously known models, yet which does not sacrifice accuracy in mimicking the overall dynamics of the IO neuron. This is particularly advantageous for implementing large scale networks of IO-neuron-mimicking processing units in hardware.

In an exemplary embodiment, the model of the present invention is based on a set of mathematical assumptions that is capable of robustly reproducing the electrophysiological properties of IO neurons. The model exhibits each dynamic electrophysiological behavior with various degrees of complexity and accounts quite adequately for most experimental data on IO electrophysiology. Despite its mathematical simplicity the model provides a detailed qualitative study of IO neuron dynamics, and leads to the understanding of those features to be implemented in more detailed IO modeling.

More specifically, the model of the present invention demonstrates variable dimensionality depending on the parameters involved. So far, not much attention has been paid to the models that incorporate non-linear behavior and variable dimensionality. Nevertheless, the model of the present invention addresses the nature of the observed transitions between different dynamic modes and the preservation of one of such modes. The latter property is most likely responsible for the rapid rate of synchronization/desynchronization between individual neurons observed experimentally as well as sustained status quo. The variable dimensionality of the single neuron system is one of the key contributors regulating the preservation of phase or the speed of phase reset for sub-threshold oscillations. This is also one of the factors that allows the system to tune rapidly, given the large number of degrees of freedom reflected in the ensemble of such neurons. Such transitions between dynamic modes are an essential property that allows the IO neurons to implement their functional role within their network, in particular, the transitional change and the average memory of the neurons indicating how quickly an IO neuron 'forgets' the voltage trajectory of its membrane potential (and thus the memory of the system as a whole). The model of the present invention demonstrates that weakly chaotic dynamics can support a complex spike generation regime that is controllable and agile. The 'forgetting' time of the system is then the average interspike interval. The transitions also can completely erase such memory which is clearly observed experimentally as a phase reset after a stimulus. These characteristics play an important role in the organization of movement coordination.

In a further aspect of the present invention, an electronic circuit implementation of such an IO neuron model is provided. Said model shows good qualitative agreement with experimental observations obtained in vitro from Guinea pig brainstem slices.

In yet a further aspect of the present invention, multiple circuits, each modeling an IO neuron, are coupled together to form an artificial inferior olive. In an exemplary embodiment, six such IO neuron models are coupled together to form an inferior olive mechanism for a six-legged walker.

In still a further aspect of the present invention, a model mimics the process of neuronal synchronization and desynchronization including spike-train generation and the formation of coherent activity clusters and their dynamic reorganization in the olivo-cerebellar system. The behavior predicted by the model agrees well with experimental data and makes important predictions, which are possible to verify experimentally.

An exemplary embodiment of the model comprises three coupled 2-D lattices corresponding to the main cellular groups in this neuronal circuit. The model dynamics takes into account the loop linking the inferior olive (IO) neurons to the cerebellar nuclei (CN) via collateral axons which proceed to terminate as climbing fiber afferents on to Purkinje cells (PC). In the first lattice, mimicking the IO neurons, the oscillatory elements are diffusively coupled with noisy dynamics. The outputs of the first lattice act as the activating currents for the corresponding sites in the second lattice (PC) which is comprised of excitable FitzHugh-Nagumo units which can be associated with axons transferring action potential to the third lattice (CN). In turn, the CN foster the decoupling of neurons in a vicinity of a given neuron in the first lattice. The modeling results indicate that noise-induced oscillations in the first lattice are capable of synchronizing and generating firing clusters in the second, FitzHugh-Nagumo lattice. The model also provides phase resetting of oscillations in the first lattice leading to temporal silent behavior in the second lattice. The decoupling effected via the third lattice leads to a dynamic control of coupling patterns in the IO network.

Based on the detailed neuronal connectivity and electrophysiology of the olivo-cerebellar system, the present invention provides a universal control system (UCS) which reproduces some of the spatio-temporal properties of the olivo-cerebellar dynamics. An exemplary embodiment of a UCS in accordance with the present invention comprises an array of intercoupled processing units, each of which controls a particular parameter. The UCS of the present invention is capable of simultaneously controlling, in real time, a large number of parameters with high precision, flexibility and reliability by implementing a cluster control architecture (CCA) that provides stimuli-induced space-time clustering of processing unit activity.

Moreover, the apparatus of the present invention is amenable to miniaturization by implementation in a microchip form and further implementation in VLSI circuitry. This would allow simultaneous on-line control of tens to thousands of variables without a mechanical or digital computational device. The present invention thus provides a prototype for a new generation of analog control devices that are faster, smaller, cheaper and computationally much more powerful than digital computers.

BRIEF DESCRIPTION OF THE DRAWINGS

FIGS. 7A-D show an output of the exemplary model of the present invention for both depolarized and hyperpolarized conditions.

FIGS. 13A-D illustrate the membrane potential outputs of two IO neuron models that are uncoupled and closely coupled.

FIGS. 20A and B illustrate the evolution of phases characterizing the leg positions of a robotic walker without and with coordination, respectively.

DETAILED DESCRIPTION

Inferior Olive Neuron Model

Figure 1A:
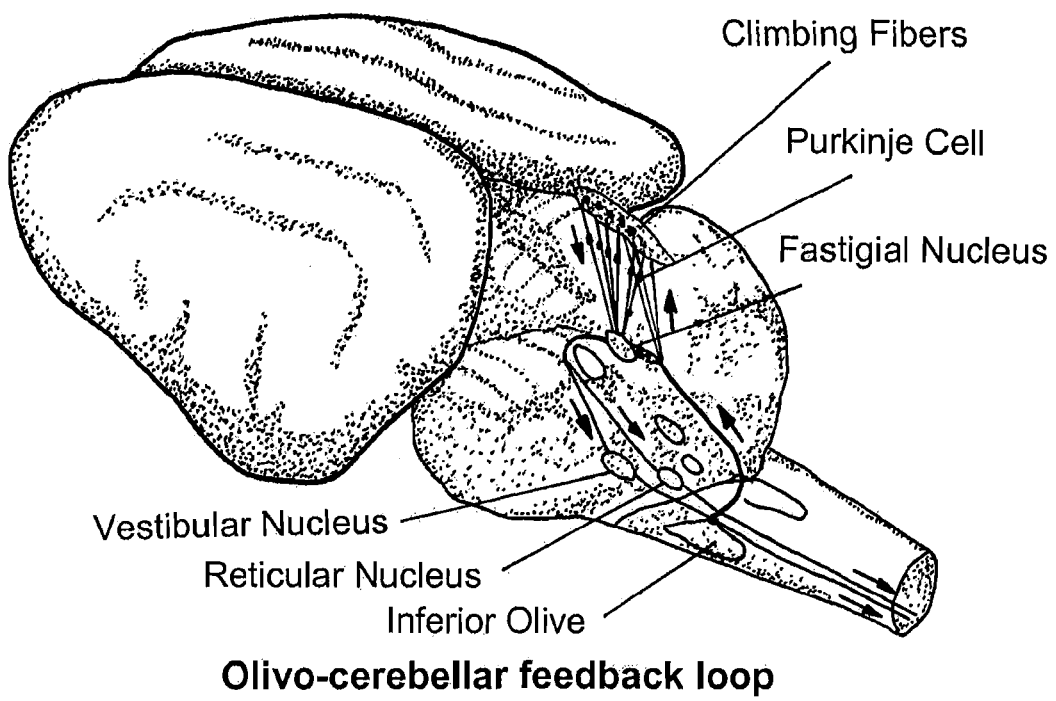
FIGS. 1A-C show the main functional structures of the olivo-cerebellar system of the brain and their interconnectivity.
Figure 1B:
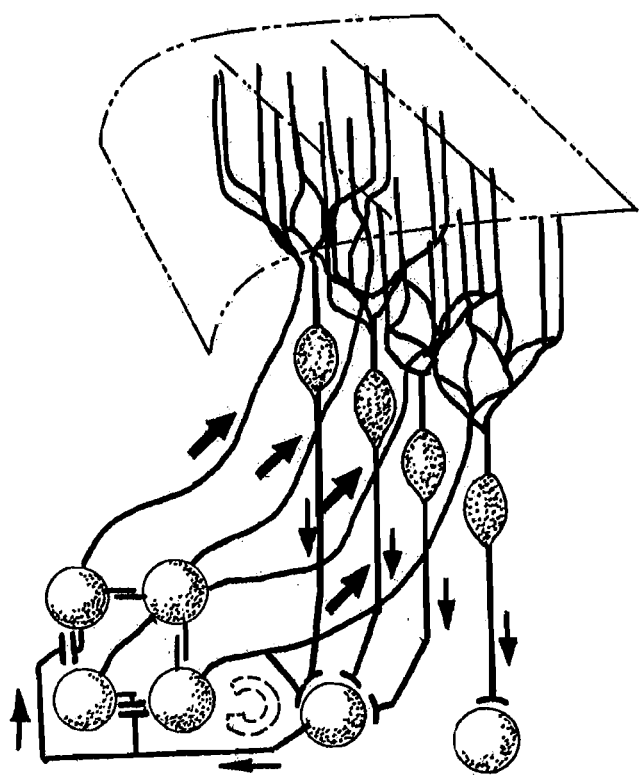
Figure 1C:
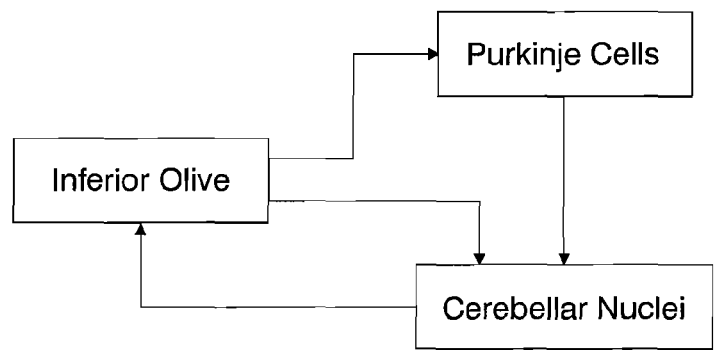
Figure 2:
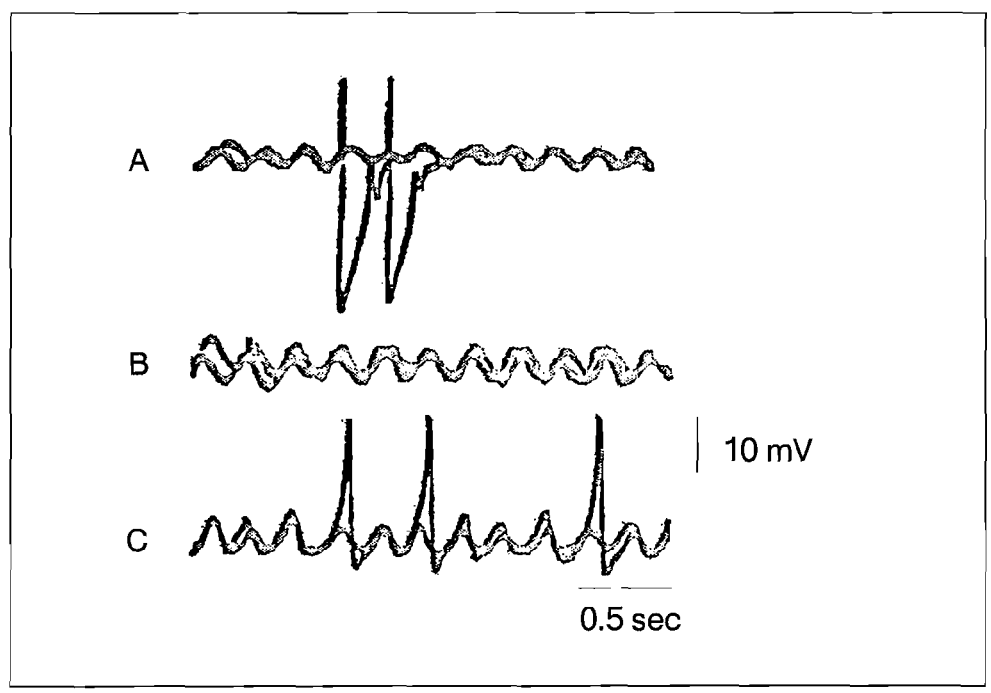
FIGS. 2A-C illustrate the membrane potential of an Inferior Olive (IO) neuron in three different states.
Figure 3:
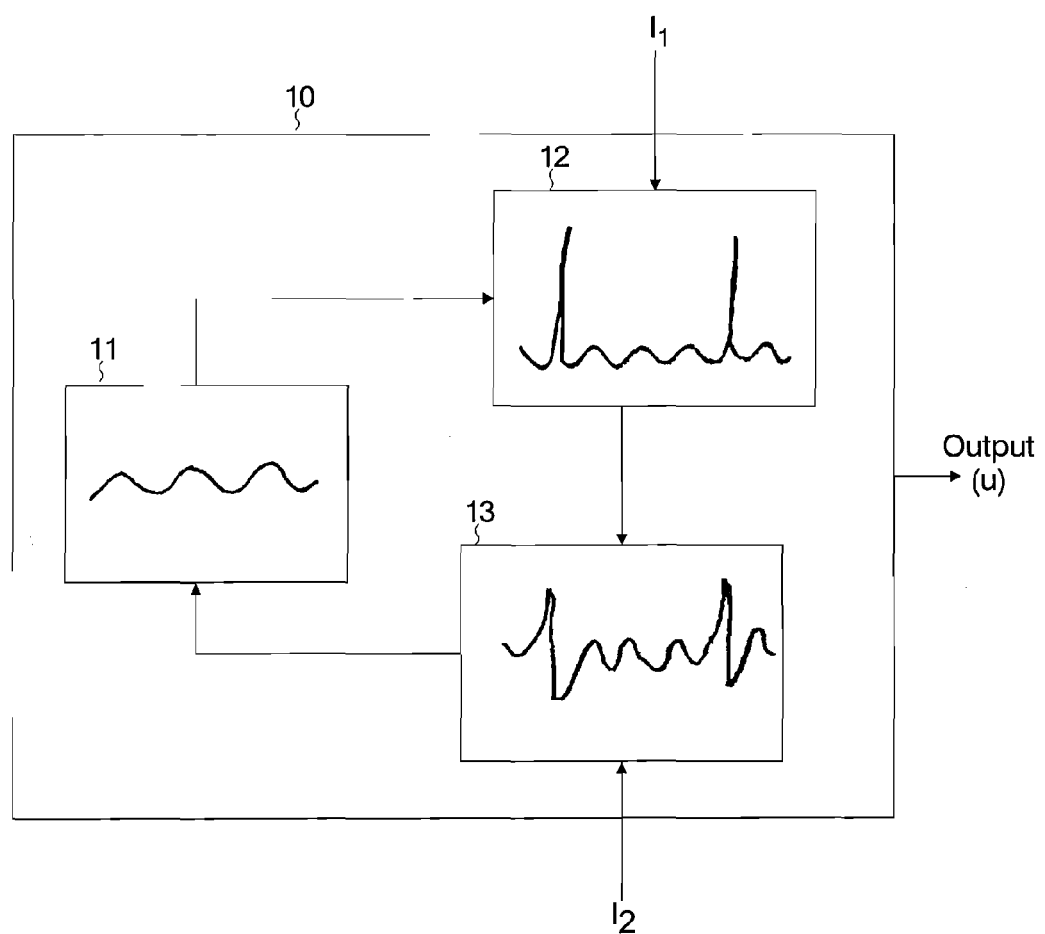
FIG. 3 shows a block diagram of an exemplary embodiment of a functional model of an IO neuron, in accordance with the present invention.
Figure 4A:
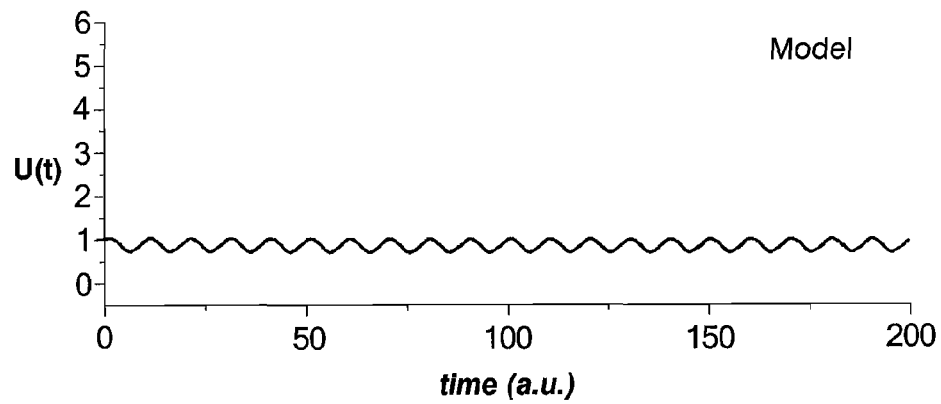
FIGS. 4A-C compare the quasiharmonic sub-threshold oscillations of the exemplary model of the present invention to experimentally observed oscillations.
Figure 4B:
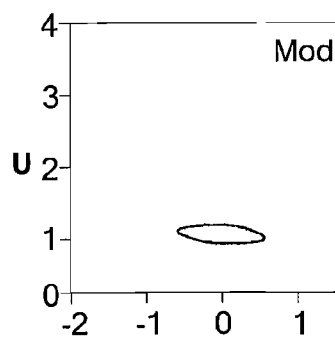
Figure 4C:
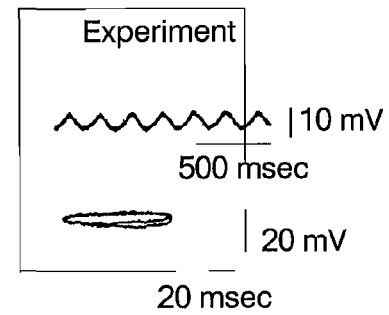

FIG. 3 shows a block diagram of an exemplary embodiment of a functional model 10 of an inferior olive (IO) neuron, in accordance with the present invention. The model 10 of the present invention can be simulated, such as on a computer, using numerical methods.

The IO neuron model of the present invention incorporates the following IO neuron dynamics: (1) autonomous sub-threshold activity comprising weakly chaotic oscillations (i.e., periodic, almost regular oscillatory dynamics with the biggest Lyapunov exponent having a positive value) having a frequency of 5 to 8 Hz; (2) rhythmic generation of action potentials when one of two distinct thresholds is reached (i.e. hyperpolarized or depolarized); (3) phase preservation of sub-threshold oscillations following spike generation.

In an exemplary embodiment, the model comprises three autonomous interacting blocks responsible for the different modes observed experimentally. The first block provides quasiharmonic oscillations. The other two blocks are responsible for spike generation at different thresholds. As shown in FIG. 3, the model comprises a quasi-sinusoidal signal generator 11, a high-threshold pulse generator 12, and a low-threshold pulse generator 13. The input to the model 10 represents stimuli applied by neighboring neurons in the form of membrane potential changes. The output of the model 10 represents the membrane potential of the IO neuron. The high-threshold pulse generator 12 generates a pulse when the signal applied to it exceeds a first threshold, whereas the low-threshold pulse generator 13 generates a pulse when the signal applied to it exceeds a second, lower threshold.

The operation of the exemplary embodiment of the IO neuron model of the present invention can be characterized by the following set of equations.

$$x'=y, \; y'=[\gamma(1+\alpha u)-x^2]y-\omega^2(1+\beta u)x \quad (1a, 1b)$$

$$\epsilon u'=f(u)-v+hw, \; v'=0.05(u-I_1)(u^2+0.5) \quad (2a, 2b)$$

$$\epsilon w'=g(w)-z-x, \; z'=0.5(w-I_2)(w^2+0.1) \quad (3a, 3b)$$

Equations 1a and 1b represent the operation of the oscillator 11, equations 2a and 2b represent the high-threshold pulse generator 12 and equations 3a and 3b represent the low-threshold pulse generator 13. The oscillator block 11 (represented by the x and y variables) is thus modeled as a Van der Pol oscillator providing robust quasiharmonic oscillations.

The pulse generator 12 (represented by the u and v variables) and the pulse generator 13 (represented by the w and z variables) are based on the FN (FitzHugh-Nagumo) mathematical model and are responsible for high- and low-threshold level spike generation, respectively.

The variable u is fast and represents the membrane potential of the neuron; the variable v is slow and accounts for ion concentrations; the parameters $\gamma$ and $\omega$ account for the amplitude and frequency of the quasiharmonic sub-threshold oscillations; and x, y, w and z are internal variables. The coefficients $\alpha$ and $\beta$ change the amplitude and frequency of oscillations depending on the membrane potential u. The parameter h determines the strength of coupling between the two pulse generators 12 and 13. $\epsilon$ defines the relaxation scale of the pulse generators and is typically much smaller than 1. While the two pulse generator blocks are represented by similar equations, the time scales used are substantially different. Exemplary values for the aforementioned parameters are as follows:

$\epsilon=0.01 \; \gamma=0.21$
$\omega^2=0.63 \; \alpha=1.8$
$\beta=0.5 \; h=0.5$ $I_1$ and $I_2$ are control parameters which represent constant current stimuli that change the membrane potential level. When the membrane potential reaches certain thresholds, sodium and/or calcium currents are triggered and pulses are generated.

The functions f(u) and g(w) are non-linear, cubic-shape form functions which can be piece-wise linearly approximated as follows:

$$f(u) = \begin{cases} -1.5u & \text{if } u < a \\ 0.2u - 1.7a & \text{if } a < u < 4 \\ -1.6u - 1.7a + 9.6 & \text{if } u > 4 \end{cases} \text{ and} \quad (4)$$

$$g(w) = \begin{cases} -2.0w & \text{if } w < b \\ 3.0w - 5.0b & \text{if } b < w < 1 \\ -5.0w - 5.0b + 8.0 & \text{if } w > 1 \end{cases} \text{ and} \quad (5)$$

where the parameters a and b define the high- and low-threshold values, respectively. The values of the coefficients in Eqs. 4 and 5 characterize the width, height and refractory period of the pulses generated by the pulse generators 12 and 13.

FIGS. 4 through 7 illustrate the operation of the IO neuron model of the present invention in comparison to the experimentally observed behavior of IO neurons in vitro. The various outputs of the model 10 were obtained numerically using the above-described system of equations. FIGS. 4A and 4B show quasiharmonic sub-threshold oscillations of the model 10, with parameter values of $I_1$=0.9 and $I_2$=−0.7. The time scale is shown in dimensionless units. FIG. 4C shows experimentally observed sub-threshold oscillations.

When the amplitude of the oscillations becomes large enough to reach the firing threshold, the neuron generates an action potential. The increase in the amplitude of the sub-threshold oscillations can be observed experimentally by pharmacological means or by direct current injection across the membrane of the neuron leading to membrane depolarization or hyperpolarization. At rest, the oscillations of the membrane potential are below the spike-inducing threshold. Depolarization of the membrane results in the generation of action potentials at the peak of the membrane oscillatory wave.

Figure 5A:
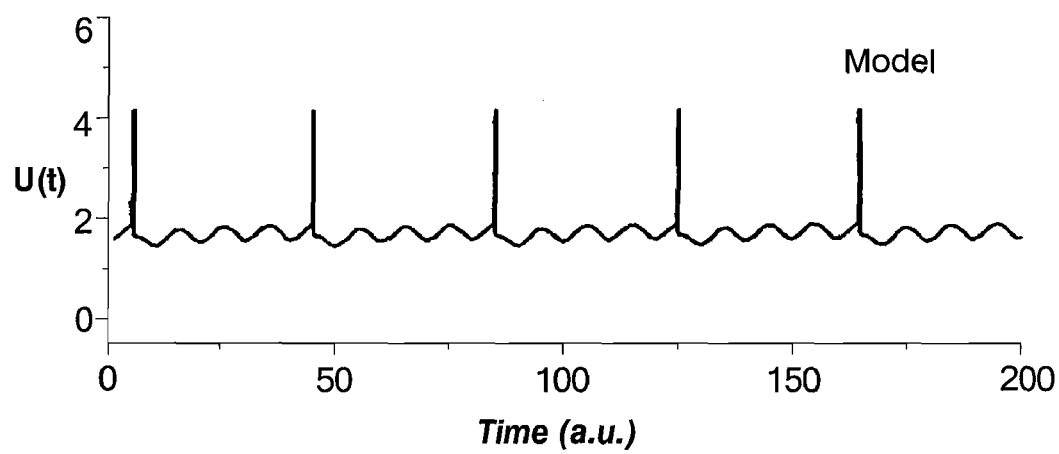
FIGS. 5A and B show a spiking output of the exemplary model of the present invention for a depolarized condition.
Figure 5B:
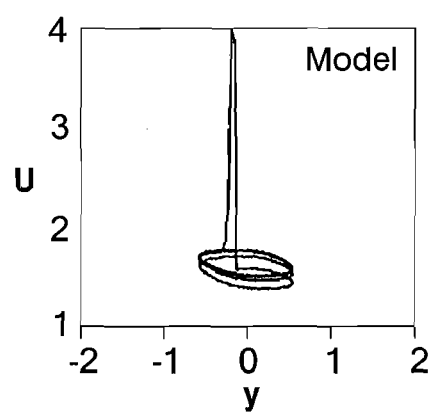

With a suitable choice of parameter values, it is possible to obtain qualitatively similar membrane potential behavior as that observed experimentally. FIG. 5A shows the output of the model 10 exhibiting the spiking that occurs when the membrane of the IO neuron is depolarized to the point at which the threshold for spiking is met. FIG. 5B shows the same output in phase space. In this exemplary case, the parameter values are I.sub.1=1.68 and I.sub.2=−0.65. The spiking is generated by the high-threshold pulse generator 12 and mimics the behavior that is associated with sodium (Na.sup.+) currents in the IO neuron.

Figure 6A:
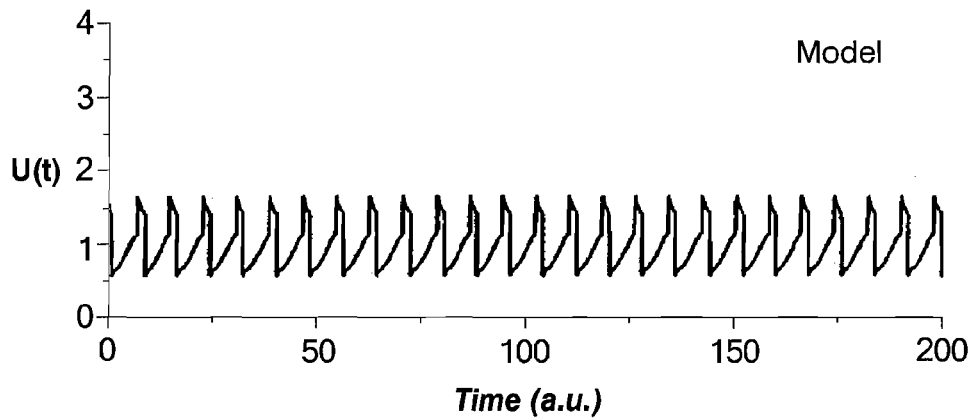
FIGS. 6A-D show a spiking output of the exemplary model of the present invention for a hyperpolarized condition.
Figure 6B:
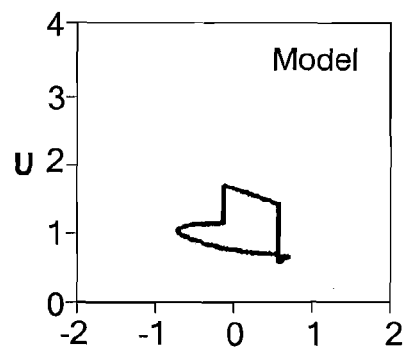
Figure 6C:
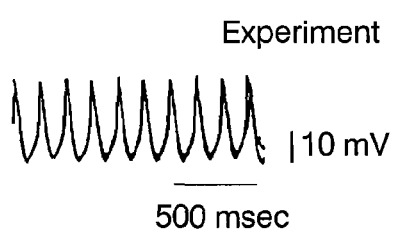
Figure 6D:
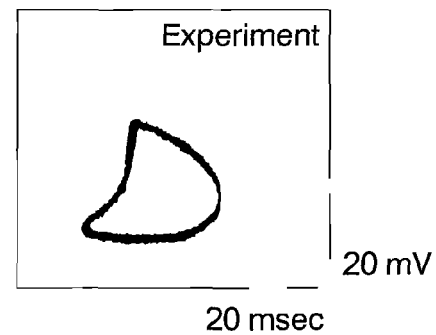

As is characteristic of IO neurons, in addition to firing at depolarized levels, the IO neuron model 10 also fires at hyperpolarized levels which are associated with calcium ($Ca^{2+}$) currents in the IO neuron. Such behavior is shown in FIGS. 6A through D. FIGS. 6C and D show the action potential of an IO neuron as observed experimentally when the membrane is hyperpolarized. In FIGS. 6A and B similar results are observed in the model by increasing the value of the parameter $I_2$. In this case, the parameter values are $I_1$=1.14 and $I_2$=−0.63. In the case of hyperpolarization, the low threshold spikes are generated by the activation of the pulse generator 13. Note that the shapes of the spikes are different for the two different types of spiking behavior.

When both mechanisms for neuronal spike generation are activated ($Ca^{2+}$ and $Na^+$) the typical results are shown in FIGS. 7A-D. The spike activated at the most negative threshold causes the system to reach the high threshold where another spike is generated. As in experimental findings, such a low threshold spike can generate a high threshold spike only within a given range of membrane potentials. In this example, the parameter values are $I_1$=1.27 and $I_2$=−0.63.

The frequency of spontaneous spike firing of the IO neuron model is approximately 1 Hz (i.e. 1 spike per approximately 10 cycles of the 10 Hz sub-threshold oscillations), which comports with experimental findings. In the model, the firing frequency can be tuned with the parameters $I_1$ and $I_2$ of Eqs. 2a, 2b and 3a, 3b whose values move the base line of the sub-threshold oscillations up or down with respect to the spike firing thresholds. Note that the firing frequency of the IO neurons is limited by the frequency of the sub-threshold oscillations as the action potential is generated only at voltages near the peak of the oscillation. As such, the sub-threshold oscillatory behavior imposes a discrete increment for possible changes of the interspike interval (by change in amplitude of the oscillations), which is equal to the period of the oscillations.

Moreover when a triangular or a sinusoidal external current controls the membrane potential, the model exhibits the above mentioned low- and high-threshold firing properties, sequentially. This behavior is shown in FIGS. 8A-E. With triangular wave stimulations (FIGS. 8A-C), the model starts from a large (in absolute value) hyperpolarizing current. Upon reaching the low threshold, the model generates a spike, which if large enough, triggers a high threshold spike as it reaches the second threshold. Subsequently, the value of the membrane potential increases as the current ramps up, until a high threshold spike is generated, similar to that produced by sodium conductances in an actual IO neuron. At this depolarized level, suppression of calcium conductance in an actual IO neuron is caused by inactivation of the T-type calcium current. In the example shown, the external current stimulus has an amplitude of $A_{st}$=1.1 and a frequency of $w_{st}$=0.14 and $I_1$=0.14 and $I_2$=−0.45.

Figure 8A:
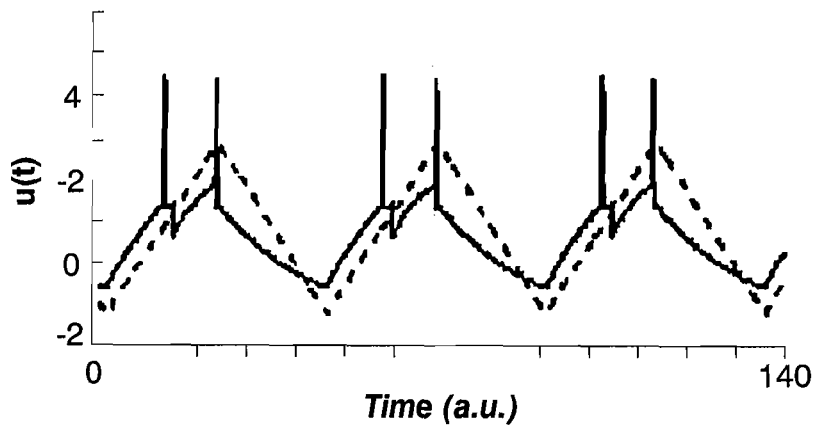
FIGS. 8A-E illustrate the output of the exemplary model of the present invention for double-ramp and sinusoidal stimulation patterns.
Figure 8B:
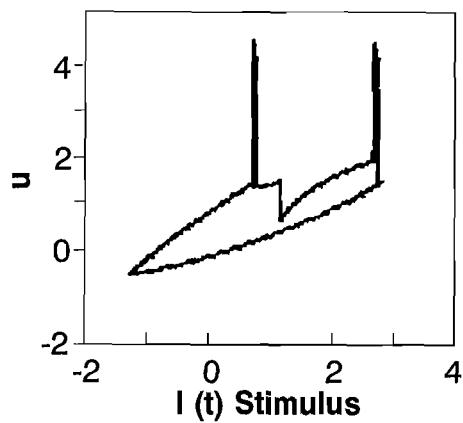
Figure 8C:
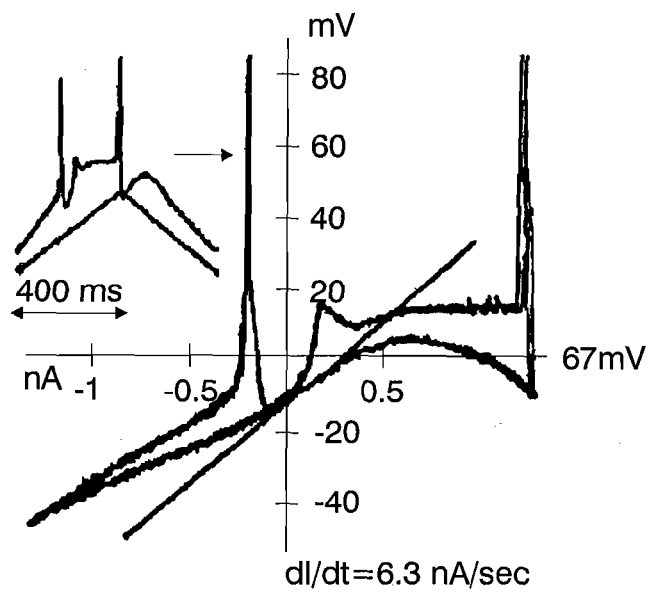
Figure 8D:
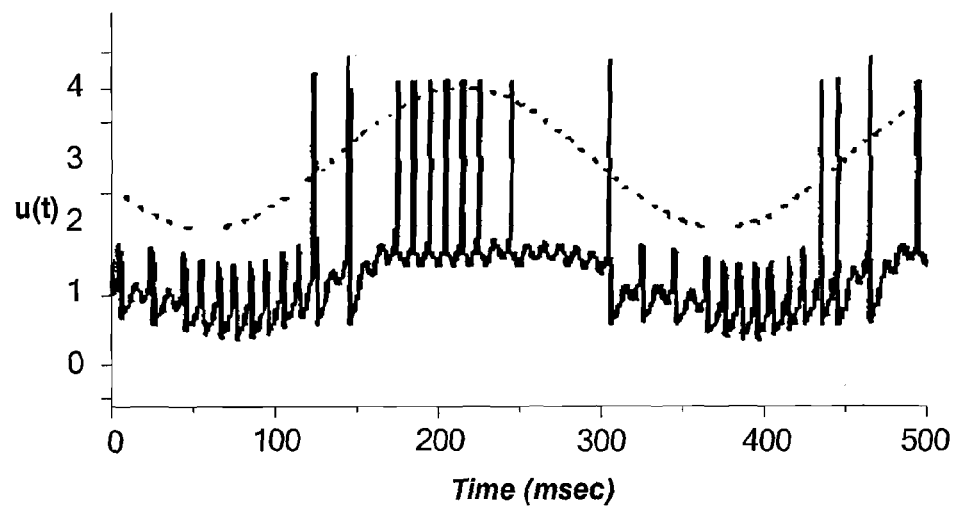
Figure 8E:
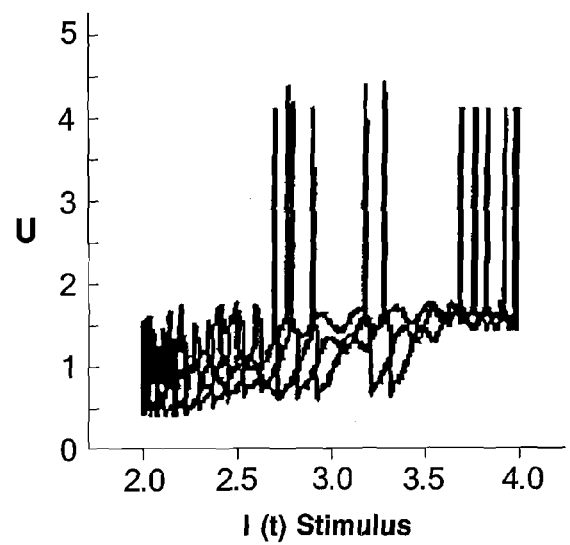

In the case of external stimulation of a sinusoidal shape with very low frequency relative to the sub-threshold oscillations, all types of firing (sodium, calcium, and calcium plus sodium) are exhibited, as shown in FIGS. 8D and E. In this example, $I_1$=1.53, $I_2$=−0.55, $A_{st}$=2.3, $w_{st}$=0.02.

A comparison of the dynamics of the IO neuron model 10 with the dynamics of an actual neuron can be done by estimating the values of the Lyapunov exponents for the sub-threshold oscillations of the model. Towards that purpose, a standard procedure based on average mutual information is applied to determine the appropriate time delay for the reconstruction of an attractor from the modeled oscillations:

$$I_{AB} = \Sigma P_{AB}(a_i, b_j) \log_2(P_{AB}(a_i, b_j)/(P_A(a_i)P_B(b_j))) \quad (6)$$

where A and B are the same time series but shifted with respect to themselves with a time delay $\tau$ so that b(i)=a(i+$\tau$); $P_A(a_i)$ is the probability distribution for the time series A; $P_B(b_j)$ is the probability distribution for the time series B; and $P_{AB}(a_i, b_j)$ is the conditional distribution for A and B. Utilizing different time delays, the first minimum is found, i.e. that time delay when the system's 'forgetfulness' reaches a maximum concerning its past trajectory. Embedding dimension is determined by the false nearest neighbors method, which estimates the Euclidean distance between nearest points on the trajectory in consequent dimensions to determine which dimension has the fewest neighbors.

Figure 9:
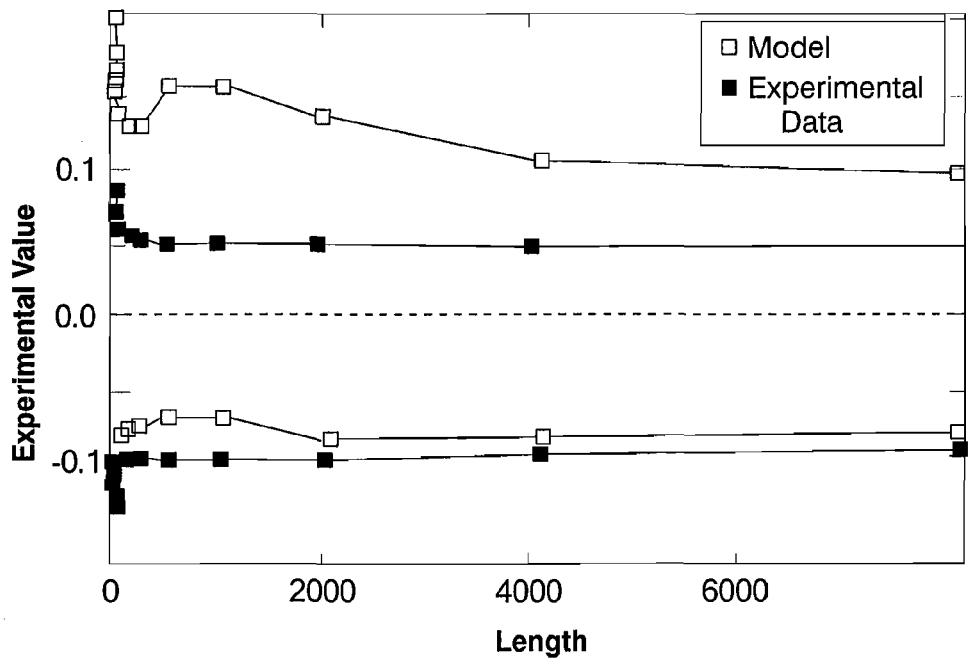
FIG. 9 shows an estimation of Lyapunov exponents from the model of the present invention and experimentally obtained data.

FIG. 9 shows the estimation of Lyapunov exponents from the time series of the model 10 and of experimental data. The "Length" axis represents the length of the series of calculated local Lyapunov exponents. As shown by FIG. 9, the estimated values of the Lyapunov exponents are in good agreement with the values determined from experimental data. This indicates a close correlation between the IO neuron model 10 and the real system in terms of the characteristics of the dynamics defined by the Lyapunov-exponents.

IO Neuron Model Circuit

As discussed, the IO neuron model 10 of the present invention can be implemented in software (i.e., as a computer simulation based on the model) as well as in hardware. In accordance with a further aspect of the present invention, a circuit implementation of the model 10 will now be disclosed.

Figure 10:
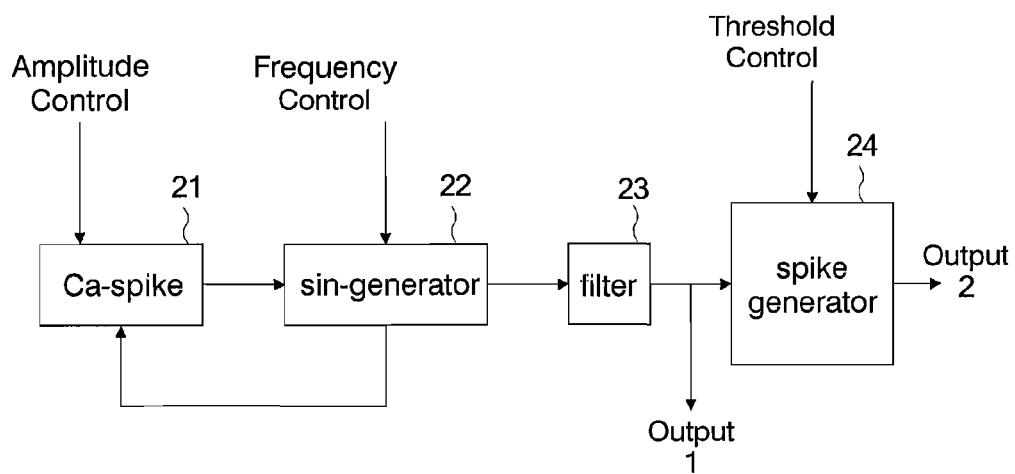
FIG. 10 shows a functional block diagram of an exemplary circuit implementation of an IO neuron model in accordance with the present invention

FIG. 10 is a functional block diagram of a circuit implementation of the IO neuron model described above. The circuit comprises a first spike generator 21, a sinusoidal generator 22, a filter 23 and a second spike generator 24. Inputs are included to control the amplitude of signals generated by the first spike generator 21, the frequency of the sinusoidal signal generated by the sinusoidal generator 22 and the spiking threshold of the second spike generator 24. A first output is provided at the output of the filter 23 and a second output is provided at the output of the second spike generator 24. The various blocks and signals will now be described in greater detail with reference to an actual circuit implementation.

Figure 11:
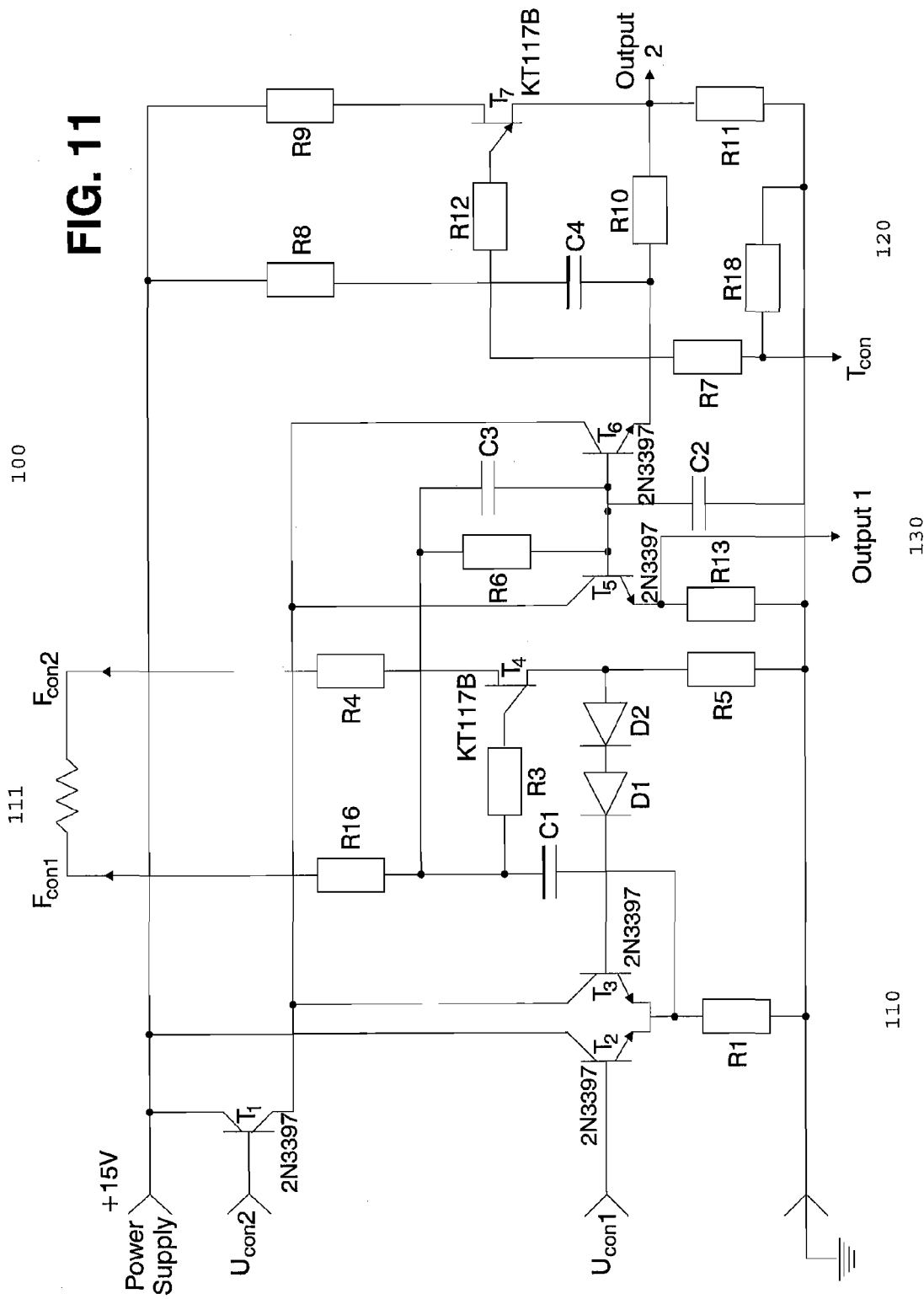
FIG. 11 shows a schematic diagram of the circuit of FIG. 10.

FIG. 11 shows a schematic diagram of an exemplary embodiment of a circuit 100 implementing the IO neuron model 10 of the present invention. The circuit comprises three blocks 110, 120 and 130 which generally correspond, respectively, to the quasi-sinusoidal, sub-threshold signal generator 11, the high-threshold pulse generator 12, and the low-threshold pulse generator 13 of the model 10. The circuit 100 can thus generate the following modes of operation:

(1) quasi-sinusoidal oscillation of period T;
(2) quasi-sinusoidal oscillation together with spikes at the peaks of the oscillations, the spikes having a duration of $\tau_1$~0.01T and a controllable amplitude; and
(3) quasi-sinusoidal oscillation together with spikes at the peaks of the oscillations, the spikes having a duration of $\tau_2$ 0.01T and a controllable amplitude larger than that of the wider, low-threshold spikes.

Control of the oscillation modes occurs by the voltage applied at either a first control input $U_{con1}$ or at a second control input $U_{con2}$ of the circuit 100. The two control inputs are also used to couple the circuit to other IO neuron model circuits to build a network of IO neuron models.

The circuit 100 has two outputs: Output 1 provides the sub-threshold oscillation with low-amplitude (Ca) spikes whereas Output 2 provides a composite signal which includes the sub-threshold oscillation, low-amplitude (Ca) spikes and the higher amplitude (Na) spikes. The voltage of Output 2 thus represents the membrane potential of the IO neuron.

The frequency of the sub-threshold oscillation is tuned by a linear resistor 111 coupled to the circuit as shown in FIG. 11. The threshold of the high-amplitude (i.e., Na) spike generation can be changed by a linear resistor connected between the ground and the threshold control input $T_{con}$ of the circuit.

The circuit 100 comprises five emitter followers implemented with transistors $T_1$, $T_2$, $T_3$, $T_5$, $T_6$ and two multivibrators using junction field-effect transistors (JFET) $T_4$ and $T_7$.

The emitter follower with transistor $T_1$ drives the collector voltages of the transistors $T_3$, $T_5$ and $T_6$. When the input $U_{con2}$ is connected to the power supply voltage (e.g., +15 volts DC), the common collector voltage of the transistors $T_3$, $T_5$ and $T_6$ is substantially the same as the power supply voltage. Moreover, the frequency control inputs are interconnected by a zero resistance bridge and the threshold control input $T_{con}$ is connected to ground potential.

Figure 12A:
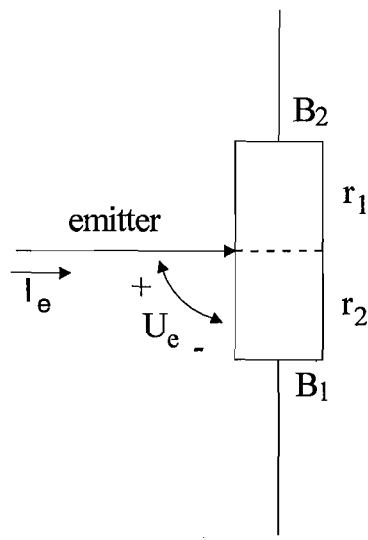
FIGS. 12A and B show the equivalent circuit and voltage vs. current performance, respectively, of a transistor of the circuit of FIG. 11.
Figure 12B:
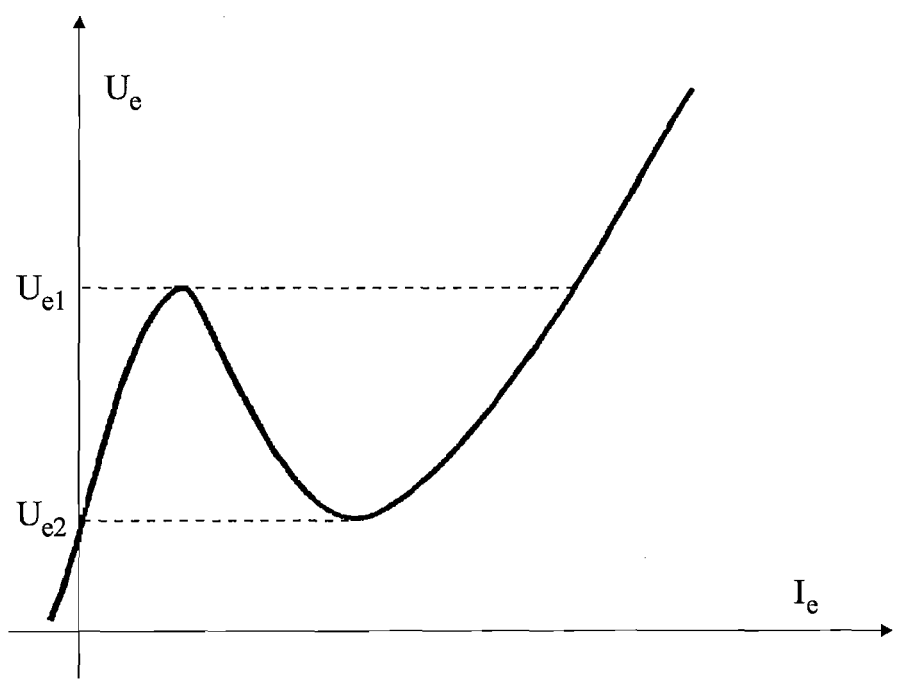

The quasi-sinusoidal oscillation is generated by the multivibrator implemented with the transistor $T_4$. FIG. 12A illustrates the equivalent circuit that takes into account the resistance between the bases $B_1$ and $B_2$ (or source and drain) of the JFET. The latter represents a semiconductor rod with ohmic contacts at the ends and a pn-junction in the middle. The part of the rod from the ohmic contact $B_2$ to the pn-junction has resistance $r_2$ and the remainder (i.e., from the pn-junction to the contact $B_1$) has resistance $r_1$. The relationship between the voltage across the emitter (or gate) and the base $B_1$ (denoted by $u_e$) and the emitter current (denoted by $I_e$) is shown in FIG. 12B. As can be seen in FIG. 12B, a segment of the voltage-current characteristic of the FET exhibits a negative differential resistance between the emitter and the base $B_1$.

The quasi-sinusoidal oscillation is developed across the capacitor C1 as the result of its periodic charging and discharging. Charging of capacitor C1 occurs through the path: power supply (+15 v)-C1-R1-ground. C1 is discharged through the path: C1-R3-$r_1$ (the resistance of the open pn-junction of $T_4$)-R5-R1. The switching from the charging to the discharging phase occurs at those instances when the voltage $u_e$ between the emitter and the base $B_1$ reaches the critical value $u_{e1}$. Opposite switching takes place when $u_e$ decreases to the value $U_{e2}$.

In order to generate voltage pulses with duration $\tau_1$~0.1T at the peaks of the quasi-sinusoidal oscillation (mode 2), the multivibrator is provided with a positive feedback loop. The feedback loop comprises diodes D1 and D2, coupled in series, and two emitter followers on transistors $T_2$, $T_3$ with common load resistor R1. The voltage across the load resistor 5 of the multivibrator is applied to the base of the transistor $T_3$ through the series combination of diodes D1 and D2.

The anode of the diode D2 is connected to the resistor R5 and the base $B_1$ of the transistor $T_4$. The cathode of the diode D1 is connected to the base of the transistor $T_3$. The voltage at the control input $U_{con1}$ which controls the strength of the positive feedback is provided to the base of the transistor $T_3$. The emitters of the transistors $T_2$ and $T_3$ are connected together and to the capacitor C1 and the resistor R1.

In mode 1 of operation, a large positive voltage $U_{con}$ is applied to the $U_{con1}$ input (i.e., the input is tied to +15 v). The transistor $T_2$ is thus turned on and the voltage across the resistor R1 is approximately $U_{con}$. In mode 1, the value of $U_{con}$ meets the following condition:

$$U_{con} > U_{max} - 2\psi_d - \psi_t, \quad (7)$$

where $U_{max}$ is the maximum voltage on the resistor R5 due to the sum of the discharging current of the capacitor C1 and the current from the power source flowing through the resistors R4, $r_2$, $r_1$, and R5; $\psi_d$ denotes the forward conducting voltage of each of the diodes D1, D2; and $\psi_t$ denotes the voltage across the emitter-base junction of the transistor $T_3$. The positive feedback loop is open by means of the blocked emitter-base junction of the transistor $T_3$.

Mode 2 of operation is entered when decreasing the voltage $U_{con}$ up to the turn-off of the transistor $T_3$. In this case, the emitter-base junction of $T_3$ turns on at the peaks of the quasi-sinusoidal oscillation thereby activating the positive feedback loop. The current from the power supply through the transistor $T_3$ causes the appearance of a pulse-like voltage across the resistor R1. This voltage increases the discharging current of the capacitor C1 thereby also increasing the voltage across resistor R5. This voltage is applied, via diodes D1 and D2, to the base of the transistor $T_3$. The voltage across the resistor $R_1$ thereby also increases. Accordingly, the pulse-like voltage appears across the resistor R1. Changing the voltage $U_{con}$ controls the amplitude of the voltage across R1. The quasi-sinusoidal voltage is formed across the capacitor C1 and low-amplitude pulses appear on the resistor R1. The sum of these voltages is applied to the bases of the transistors $T_5$ and $T_6$ (arranged as emitter followers) through the capacitance integrator R6-C2. The role of the integrator is to smooth the quasi-sinusoidal oscillation. The capacitor C3 connected in parallel with the resistor R6 serves to transmit the pulse voltage of low-amplitude spikes to the bases of the transistors $T_5$ and $T_6$.

The voltage across the load resistor R13 of the emitter follower comprising the transistor $T_5$ is used as output 1. The voltage at Output1 has a quasi-sinusoidal shape with low-amplitude pulses at the peaks. The series connection of resistors R10 and R11 represents the load resistance of the emitter follower comprising transistor $T_6$. The voltage across the resistor R11 is presented at Output2. The voltage across the resistor R10 triggers the multivibrator realized with FET $T_7$. The multivibrator works in a waiting mode and generates pulses with a large amplitude and a duration of $\tau_2$~0.01T.

The voltage divider comprising the resistors R8, R7 and R18 controls the excitation threshold of the $T_7$ multivibrator. When the resistor R18 is shorted (i.e., the $T_{con}$ input is tied to ground) the muitivibrator operates in a "hard" excitation mode, otherwise it operates in a "soft" excitation mode. In the case of hard excitation, the emitter-base voltage $u_e$ of the transistor $T_7$ is smaller than $u_{e1}$ (see FIG. 12) and the pn-junction is turned off. This state is stable and the multivibrator can maintain it indefinitely. In this case, the charging path for the capacitor C4 is: power source-R8-C4-R10-R11-ground and the resistor R7 limits the maximum charge voltage. The charging time of the capacitor C4 represents the refractory period of the pulses. The multivibrator is activated by the oscillation of the voltage on the resistor R10 changing the voltage on the emitter of the transistor $T_7$ with respect to its base. For a sufficiently large amplitude, the oscillation peaks reach the excitation threshold and the pn-junction of the transistor $T_7$ is turned on. At this point, the capacitor C4 discharges quickly via the path: C4-R12-(active pn-junction of the transistor $T_7$)-R10. This results in a pulsed voltage on the resistor R10 that increases the base-emitter current and hence the collector-emitter current of the transistor $T_6$. The collector-emitter current of $T_6$ flows from the power source, through the transistor $T_6$ and the resistors R10 and R11. The quasi-sinusoidal oscillation with low-amplitude pulses are summed with the large-amplitude short-duration pulses on the resistor R11 to provide a composite output at Output2 which reflects the membrane potential of a model IO neuron.

The circuit of FIG. 11 can be implemented on an integrated circuit. In further embodiments, multiple circuits such as that of FIG. 11 can be implemented on a single integrated circuit.

In yet a further exemplary embodiment, a single threshold model may also be implemented in accordance with the present invention. While less complex than the two-threshold model described above in detail, such a model less accurately mimics the behavior of actual IO neurons but may be sufficiently accurate for certain applications.

Artificial IO and Control System

In a further aspect of the present invention, the above-described models of IO neurons can be coupled together to model functioning ensembles of IO neurons, to form, in essence, artificial inferior olives. As in the case of individual IO neuron models, such ensembles can be implemented in software as computer simulations or in hardware by interconnecting IO neuron circuits such as that described above.

In an actual inferior olive, the neurons are coupled to each other via gap junctions. Such junctions can be modeled as linear resistive couplings, with the strength of the couplings being inverse to the resistance. As has been observed experimentally, interactions between IO neurons is largely local, i.e., ensembles of interacting neurons tend to involve a relatively small number of neighboring neurons.

As the coupling among neurons increases, the degree of synchronization of the neurons increases. As has been experimentally observed, closely coupled IO neurons form oscillatory clusters. Influencing such synchronism and intercoupling of neurons is the olivo-cerebellar loop. Via certain pathways, the cerebellum can influence the degree of coupling among IO neurons, thereby increasing or decreasing the degree of synchronism among IO neurons. This feedback mechanism leads to the formation of patterns of neuron clusters in the IO having both a temporal and a spatial distribution.

The rate of change of the difference in the phases of the sub-threshold oscillations of two IO neurons, 1 and 2, can be expressed as follows:

$$d(\phi_2-\phi_1)/dt=\Delta-2d\sin(\phi_2-\phi_1) \quad (8)$$

where $\phi_{1,2}$ are the phases of the oscillations of the respective neurons, $\Delta$ is the difference in the frequencies of oscillation of the two neurons, and d is the conductance between the IO neurons.

As the rate of change of the phase difference becomes zero, i.e., the phase difference becomes constant, the following relationship applies:

$$\phi_2-\phi_1=\arcsin(\Delta/2d) \quad (9)$$

From Eq. 9 it is clear that as d approaches infinity, the difference between the phases approaches zero and the sub-threshold oscillations of the neurons come into phase and are thus synchronized.

FIGS. 13A and B illustrate the membrane potential outputs $u_1$ and $u_2$ of two IO neuron models that are uncoupled, whereas FIGS. 13C and D illustrate the outputs of two IO neuron models that are closely coupled and thus synchronized. The IO neurons are modeled as discussed above.

Figure 14A:
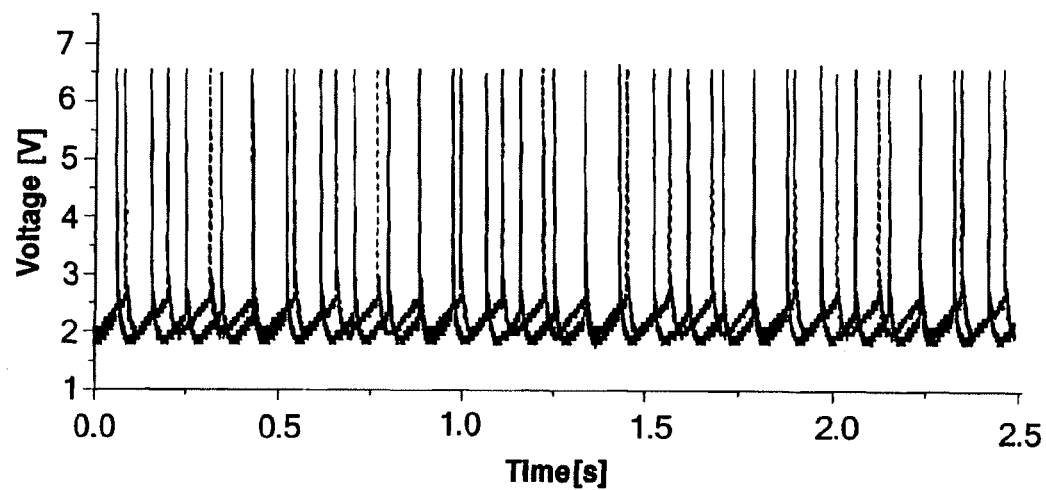
FIGS. 14A and B illustrate the membrane potential outputs of two IO neuron models that are partially coupled.
Figure 14B:
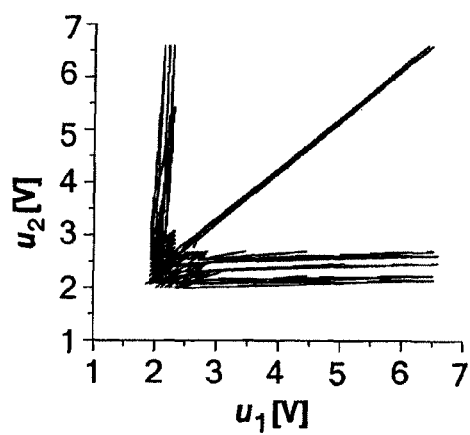

FIGS. 14A and B illustrate the membrane potential outputs $u_1$ and $u_2$ of two IO neuron models that are partially coupled (i.e., more than the case of FIGS. 13A and B but less than the case of FIGS. 13C and D). In this case, the coupling coefficient (d) is within a narrow band of values in which the two-neuron system jumps between full synchronization and no synchronization.

As discussed, the inferior olive plays a critical role in the coordination of multiple muscles to effect movement. In a further aspect of the present invention, an artificial inferior olive is formed by combining multiple IO neurons, each of which is modeled with the above-described IO neuron circuit 100.

Figure 15:
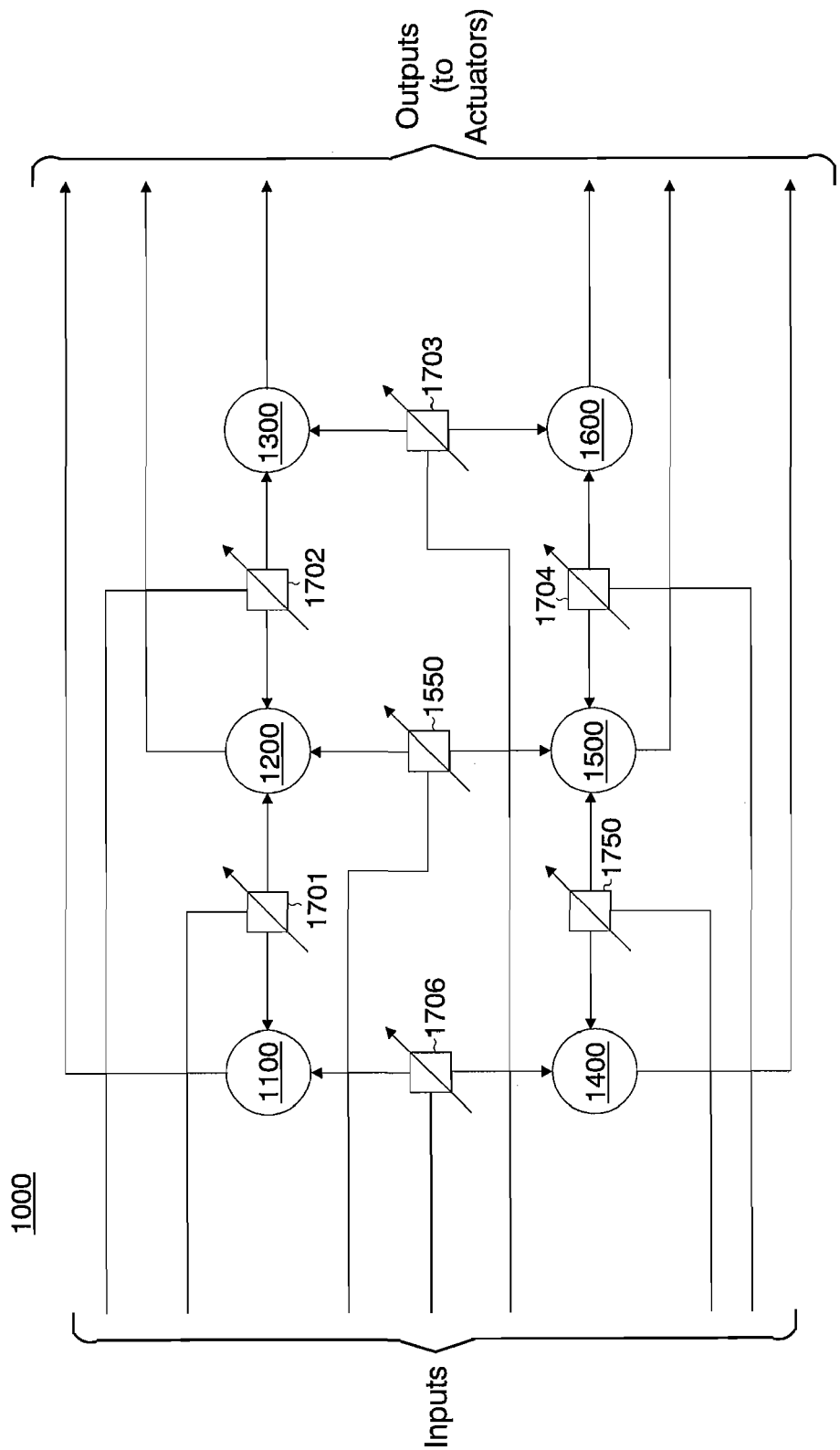
FIG. 15 shows an exemplary embodiment of an artificial inferior olive (AIO) in accordance with the present invention.

FIG. 15 shows an exemplary embodiment of an artificial inferior olive (AIO) 1000 in accordance with the present invention. The AIO 1000 comprises six IO neuron blocks 1100 through 1600, with each neuron block interconnected with its immediate neighbors. Pairs of neuron blocks are interconnected via variable conductances 1701-1706 which are controlled by inputs to the AIO 1000.

Using the above-described IO neuron circuit for each of the IO neuron blocks 1100-1600, the output of each IO neuron block is the Output2 and the input is the $U_{con1}$ input. Where multiple outputs are coupled to a single input (e.g., block 1200 receives inputs from the outputs of three neighboring blocks, 1100, 1300 and 1500), the outputs are summed. (Not all of the interconnections are shown in FIG. 15 for the sake of clarity.)

The inputs to the AIO 1000 comprise sensory signals indicating the states of the actuation elements (e.g., the legs of a walking robot) and signals representing higher level commands. The outputs from the AIO 1000 comprise the oscillatory patterns which control and correct the actuation elements.

Figure 16:
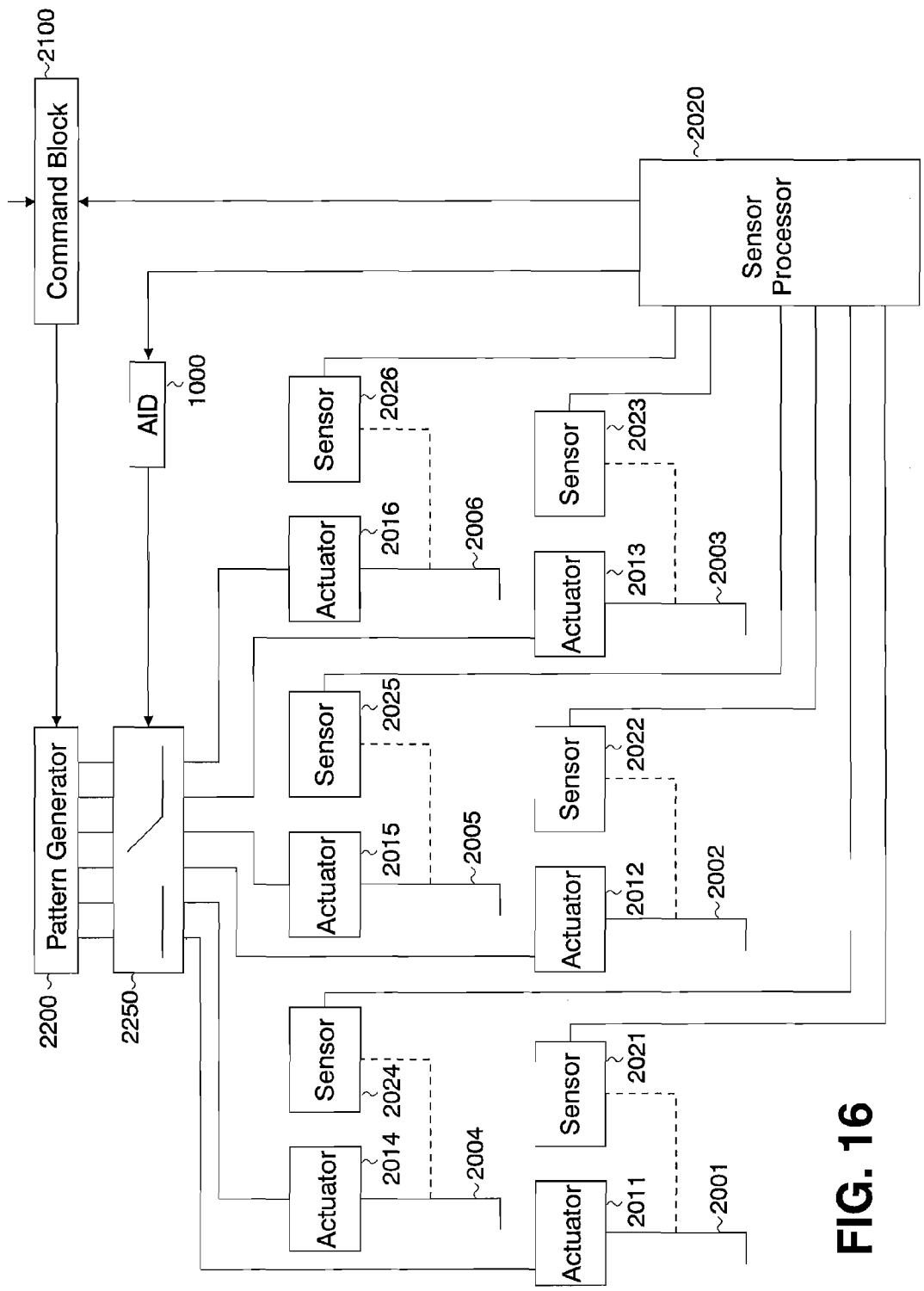
FIG. 16 shows a block diagram of an exemplary robotic walker in accordance with the present invention which includes an artificial inferior olive for coordinating motion.

FIG. 16 shows an exemplary embodiment of a control system for controlling the movement of a robotic system, such as a six-legged walking robot 2000. The robotic system 2000 incorporates the AIO 1000 to provide stable, coordinated movement while adapting to external and internal perturbations. Each leg 2001 through 2006 has associated therewith an actuator 2011 through 2016, respectively, and a position sensor 2021 through 2026, respectively. For simplicity, each leg 2001-2006 can be modeled as a single element that rotates about a pivot point. The position of each leg is defined in terms of the angle of the leg relative to the body of the walker. The actuator 2011-2016 corresponding to each leg actuates the leg by rotating the leg. The sensor 2021-2026 corresponding to each leg provides an output indicative of the angle of the leg. The sensors 2021-2026 are coupled to a sensor processor 2020 which is coupled to the AIO 1000 and to a command block 2100. The sensor processor 2020 converts the phase signal outputs of the sensors 2021-2026 into signal inputs for the AIO 1000 and the command block 2100.

Sensory inputs from the legs are provided to the AIO 1000 via the sensor processor 2020. These inputs may include an array of phase mismatches of the legs relative to the current conditions of the surface, or phase mismatches due to damage of the actuators, fluctuations, noises, and the like. In response, AIO 1000 provides control signals which correct all of the mismatches by the appropriate phase shifts of each leg.

The command block 2100 is in turn coupled to a pattern generator 2200 which is coupled to the leg actuator motors 2011-2016 via a switching network 2250. The switching network 2250 is also coupled to the AIO 1000. Based on certain criteria such as the roughness of the surface or phase error among the legs, the switching network selects either the outputs of the pattern generator 2200 or the outputs of the AIO 1000 and provides them as control signals to the actuator motors 2011-2016.

The system 2000 comprises three levels of control. The first level involves the sensor and actuator motor of each leg and corrects for local problems pertaining to the leg. This local feedback loop drives each leg independently correcting local or small problems that do not require changing the rhythms of the other legs. Such local problems can be, for example, small phase mismatches caused by the variable solidity of the surface which each leg acts upon. For the system, such mismatches appear as phase noise.

The second control level involves the AIO 1000 which provides information processing and fine tuning for small problems, described more fully below.

The third level of control involves the command block 2100 and pattern generator 2200 and entails higher-level functions such as changing the rhythm of the walker from walking to running or commanding the walker to jump. The command block 2100 specifies to the pattern generator a function to be carried out by the walker based on higher-level inputs such as from artificial intelligence or human input. Exemplary functions may include walking, running, jumping, skipping, etc. If need be, the command block 2100 uses the phase signals from the sensor processor 2020 to replace the active pattern template that is carried out by the pattern generator 2200.

The pattern generator 2200 generates default patterns of actuation of the legs 2001-2006 in accordance with the function specified by the command block 2100. For example, for walking, the pattern generator 2200 causes the legs to actuate in a regular, alternating pattern having a given cadence. When commanded to perform running, the pattern generator 2200 will cause the legs to actuate in a different pattern, with a different cadence.

While such regular, predetermined patterns of actuation may provide satisfactory movement of the walker over smooth, regular surfaces, if the walker is to operate over imperfect surfaces, the AIO 1000 provides the walker with the ability to adapt to the random irregularities encountered by each leg of the walker while maintaining coordinated motion. Under such conditions, the switching network 2250 selects the outputs of the AIO 1000, as opposed to the outputs of the pattern generator 2200, to control the actuator motors 2011-2016 of the legs. Although the pattern generator 2200 dictates the general rhythm, the sensory feedback and the AIO 1000 provide the real time adaptation of the legs to the current surface conditions, which appears as the appropriate phase stray. From time to time, the control system "asks" the pattern generator 2200 for general correctness of the current rhythm. The rest of the time, the control system works independently of the pattern generator.

Figure 17:
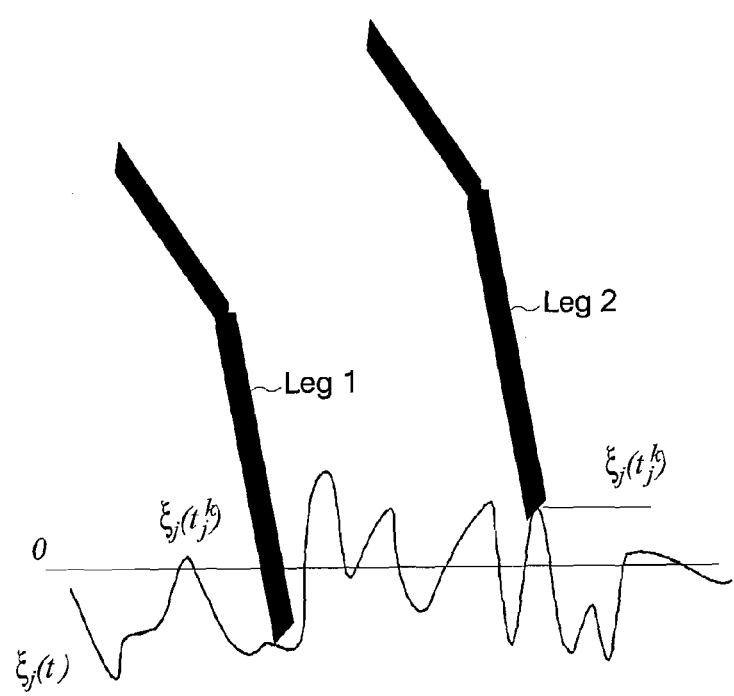
FIG. 17 illustrates the operation of a robotic walker over an imperfect surface.

As illustrated in FIG. 17, in the course of walking over an imperfect surface, each leg of the walker will typically encounter different elevations. To move over such a surface in a smooth and coordinated manner, the angular position (or phase) of some legs should be advanced with respect to a default position (denoted by the "0" line) while the angular position of other legs should be delayed with respect to the default position. Thus in the case of the two legs 1 and 2 shown in FIG. 17, the phase of leg 1 is to be advanced relative to the default phase, whereas the phase of leg 2 is to be delayed.

Figure 18A:
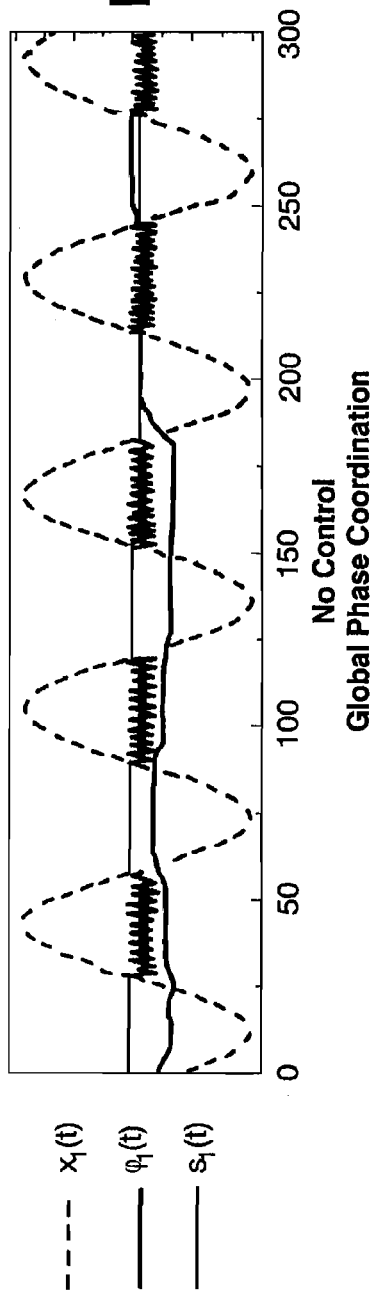
FIGS. 18A-C show various parameters associated with two legs of a robotic walker operating over an imperfect surface without coordination.

FIGS. 18A and B show the phase φ(t), the actuation signal x(t), and the surface profile s(t) encountered by each of two legs (1, 2) over time. As shown, each leg encounters randomly irregular surfaces. Note that s(t) is constant while x(t) is negative because the tip of the respective leg is stationary during this portion of the actuation cycle of the leg. While x(t) is positive, however, the tip of the leg is moved along the surface and as a result, s(t) takes on the irregular profile of the surface.

FIGS. 18A and B show how the phases of the two legs evolve over several cycles in which the AIO 1000 does not provide coordination. In this case, the phase of each leg is under the control of the local feedback loop (actuator/sensor) of each leg. As shown in FIG. 18C, the AIO is in a sub-threshold oscillatory state and is not providing coordination. u(t) is the output of the 10 controlling set (the neuronal cluster) associated with a particular leg. If u(t) is not spiking, there is no control at all (no output signal from the IO neurons). If it is spiking, the output (the correct phase shift template) is transmitted to the platform.

Figure 18B:
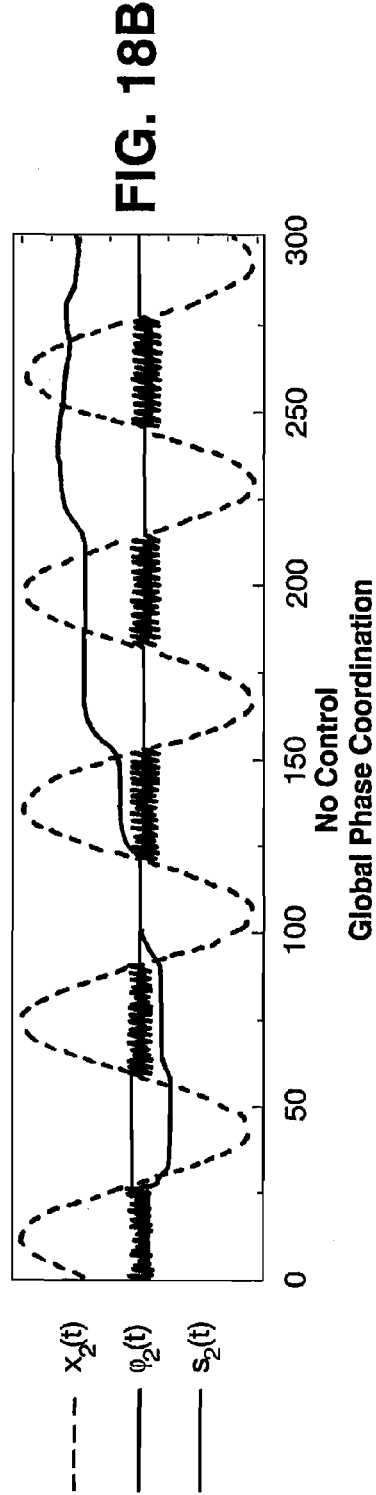
Figure 18C:
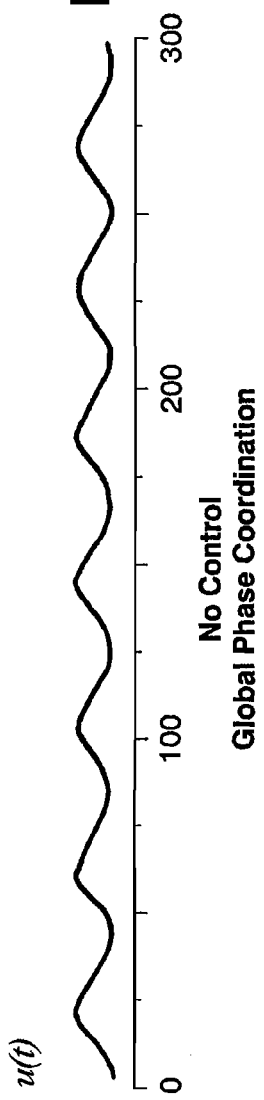

As can be seen particularly in FIG. 18B, the phase of leg 2 strays considerably from the default (i.e., zero) over just a few cycles.

Figure 19A:
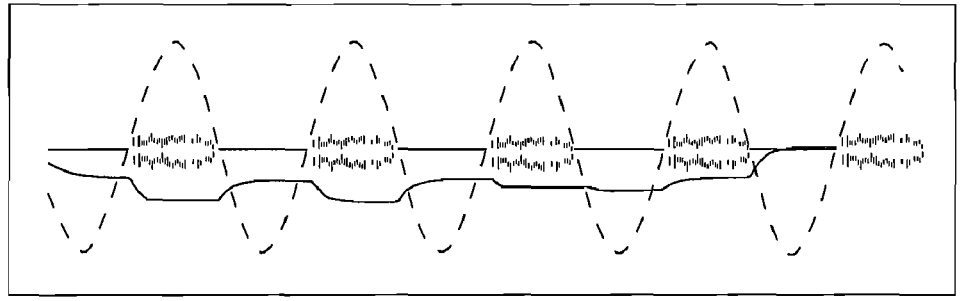
FIGS. 19A-C show various parameters associated with two legs of a robotic walker operating over an imperfect surface with coordination.
Figure 19B:
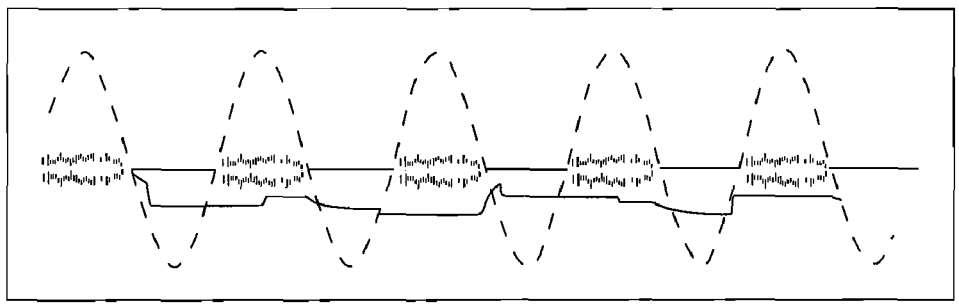
Figure 19C:
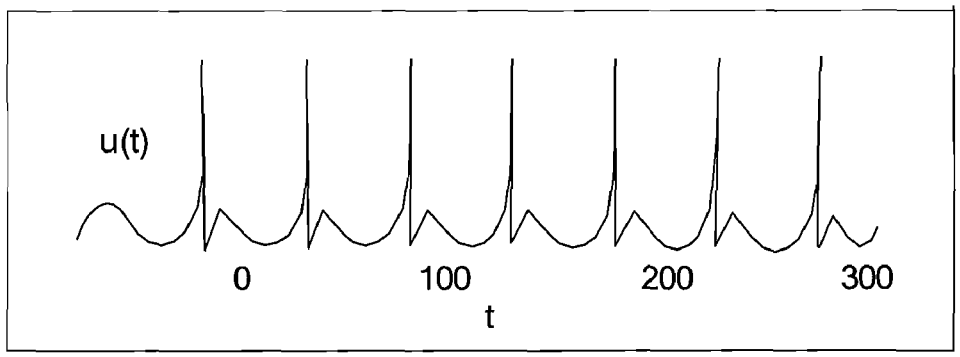

FIGS. 19A and B show how the phases of the two legs evolve over several cycles in which the AIO 1000 provides coordination. In this case, as shown in FIG. 19C, the AIO 1000 is periodically generating quasi-sinusoidal oscillations with spikes at the peaks. In this case, the phases of the legs are maintained within a relatively narrow band as the control signals generated by the AIO 1000 act to maintain, within narrower limits, the correct phase shift relations.

FIGS. 20A and B show the evolution of phases over longer periods of time in the case of no control and in the case of discrete control as provided by the AIO 1000, respectively.

While the use of an artificial IO has been illustrated in a robotic context, artificial IOs in accordance with the present invention can be used in a wide variety of areas in which the activities of multiple elements are to be coordinated including but not limited to traffic control, manufacturing process control and data communications networks.

Olivo-Cerebellar System Model

As mentioned above, the activity of IO neurons in an actual inferior olive demonstrates spatio-temporal cluster formation. The shapes, sizes and distribution of said clusters play a role in the coordination of complex activities. How such clusters are formed, their shapes, sizes and distribution are controlled by the release of certain chemicals which influence the degree of coupling among IO neurons. The release of said chemicals is under the control of cerebellar neurons which in turn are influenced by IO neuron activity, thereby forming a closed feedback loop. In accordance with a further aspect of the present invention, such clustering of IO neuron activity in an artificial inferior olive is provided to effect the coordination of complex activities.

The olivo-cerebellar system represents a high level controller for movement execution. It can simultaneously address an enormous number of tasks coordinating multiple muscles to work in synchrony. The system is flexible and reliable and capable of reorganizing itself according to current conditions. For a given task, it presents a pool of possible solutions from which the executing system can choose. The executing system chooses from the pool of possible solutions by the natural evolution of its dynamics, in search of the nearest energetic minimum which would satisfy external stimuli from the environment and the control template. Small perturbations from the environment can cause the system to move between minima which satisfy the control template.

The system can, in addition, survive local internal damage as well as damage of the input-output pathways or of the executing mechanism.

Figure 21:
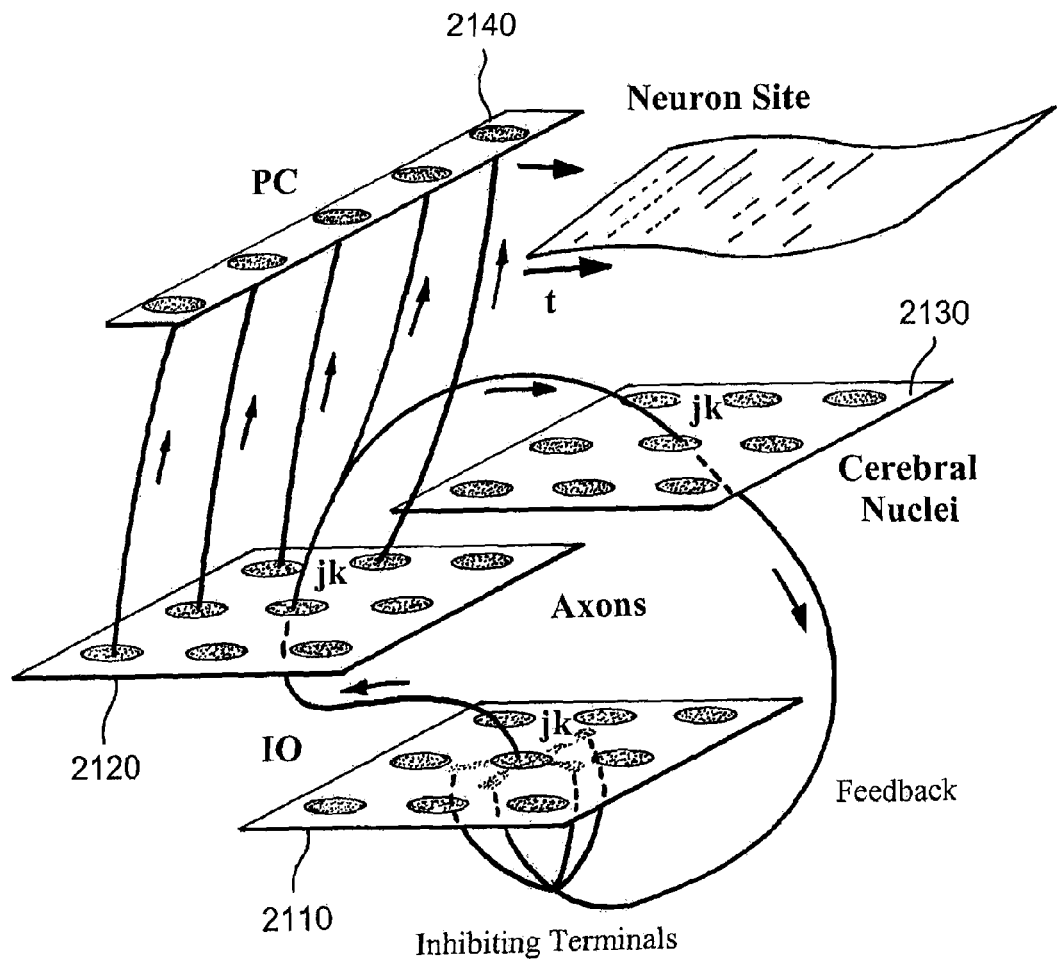
FIG. 21 is a schematic representation of an exemplary model of the olivo-cerebellar system, in accordance with the present invention.

In accordance with the present invention, a model is provided that mimics the synchronization and desynchronization processes in the IO. A schematic diagram of an exemplary embodiment of the model is shown in FIG. 21. The model of FIG. 21 mimics the three basic components of the cerebellum and their interactions. The model comprises three interconnected 2-dimensional lattices which correspond to the inferior olive (IO) neurons, axons, and cerebellar nuclei (CN). The model dynamics take into account the loop linking the IO neurons to the CN via collateral axons which proceed to terminate as climbing fiber afferents on Purkinje cells (PC).

A first lattice 2110 mimics the IO neurons. The IO neurons may or may not be intercoupled. A second lattice 2120 of units mimics the excitatory properties of the axons. The units of the second lattice are not intercoupled. In addition, the activity of the axon layer reflects the spiking behavior of the PCs since the same axons that provide collateral input to CN neurons terminate as climbing fibers in the PCs.

A third lattice 2130 involved in the loop corresponds to the cerebellar nuclei (CN). The CN lattice 2130 receives stimuli from the axon lattice 2120 and provides feedback to the IO lattice 2110 by decreasing the inhibitory postsynaptic potential (IPSP) corresponding to the temporary disruption of couplings between IO neurons in the vicinity of a given neuron.

In the IO lattice 2110, oscillatory elements mimicking individual neurons are diffusively coupled with noisy dynamics. The outputs of the first lattice 2110 act as the activating currents for the corresponding sites in the axon lattice 2120. In the exemplary model, the axons are modeled as excitable FitzHugh-Nagumo units which act to transfer action potentials to models of the cerebellar nuclei in the CN lattice 2130. In turn, the corresponding CN sites in the CN lattice 2130 influence the decoupling of IO neurons in the vicinities of the corresponding IO neurons in the first lattice 2110.

The modeling results indicate that noise-induced oscillations in the IO lattice 2110 are capable of synchronizing and generating firing clusters in the axon lattice 2120. The model also provides phase resetting of oscillations in the IO lattice leading to temporal silent behavior in the axon lattice. The decoupling effected via the CN lattice 2130 leads to a dynamic control of coupling patterns in the IO lattice 2110. While morphological studies show that the electrical couplings amongst neurons in the IO are rather complex, for the sake of simplicity only nearest-neighbor electrical couplings are taken into account in this embodiment.

For purposes of the exemplary model, the process of propagation of action potentials via the axons is not modeled. Given that signal propagation is very fast (time delay is less than 3% of the base oscillation period), the time intervals for transferring spikes from IO neurons to CNs, which are similar for all axons, are negligible and can be ignored.

To visualize the spiking activity of the system, the model includes an array 2140 which can be associated with the PCs. The array 2140 receives inputs from all or some closed part of the axons (if the size of the lattices is sufficiently large). The spatio-temporal evolution of the system can be visualized by means of a raster display which plots a small vertical bar for each spiking event in the PC neurons.

The cooperative behavior of the three-lattice system of FIG. 21 will now be described in accordance with the model of the present invention.

As discussed above, IO neurons go through low amplitude sub-threshold (about 5 mV) oscillations with well defined frequency (about 10 Hz in vivo) and, eventually, fire spikes when the threshold voltage is attained. The frequency of the spiking can vary from 1 to 10 Hz. Because IO neurons have numerous different ion channels with complex and often noisy behavior, they can be modeled as oscillators subjected to noise. Noise can be introduced in the system in different ways. For simplicity, the noise is assumed to be additive white Gaussian noise. For an IO modeled by a two-dimensional (n×n) lattice with periodic boundary conditions:

$$z_{jk}' = z_{jk}(iw_0 - \gamma) + \Sigma_{lm \in L} d^{lm}_{jk}(z_{lm} - z_{jk}) + i\sqrt{2[D]}\xi_{jk}(t)] \quad (10)$$

where the pair (jk) denotes a site in the lattice, z is a complex variable characterizing the dynamics of a neuron, $\gamma$ is the damping constant, $w_0$ is the angular oscillation frequency, in the absence of noise and damping ($w_0 = 2\pi*10$ Hz), and $\xi(t)$ is a zero-mean noise with a time correlation function given by:

$$\langle \xi_{jk}(t)\xi_{lm}(t') \rangle = \delta_{jk}\delta_{lm}\delta(t-t') \quad (11)$$

D is a parameter which represents the scale of the noise intensity. $d^{lm}_{jk}$ denotes the coefficient of the electrical coupling between IO neurons (jk) and (lm). As mentioned above, the actual value of d depends on the dynamics of neurons in the CN lattice. The dynamics of the CN neurons will be described more fully below.

The summation on the right side of Eq. 10 is taken over neighboring neurons:

$$L: R^2 \geq (l-j)^2 + (m-k)^2 \quad (12)$$

where R denotes the radius of neuron interaction. For nearest-neighbor coupling, R=1.

The lattice characterized by Eq. 10 is able to produce oscillations with a well-defined frequency band which peaks around $w_0$ with relatively slowly varying amplitudes. These oscillations are the external inputs for the axon lattice 2120 which comprises excitable, FitzHugh-Nagumo units $$\epsilon u'_{jk} = f(u_{jk}) - v_{jk} \quad (13a)$$

$$v'_{jk} = u_{jk} - I_{jk}(t) \quad (13b)$$

where $\epsilon \ll 1$ is a smallness parameter, and $u_{jk}$ and $v_{jk}$ represent, respectively, voltage and recovery variables in the corresponding site (jk) of the axon lattice. For simplicity, the nonlinear function $f(u)$ has a polynomial form:

$$f(u) = \alpha(-u^5/5 + a^2*u^3/6 - a^3*u^2/4) \quad (14)$$

The parameters a and $\alpha$ control, respectively, the amplitude and duration of a pulse. For $\epsilon = 0$ the spike amplitude is $A_{sp} = 1.924a$ and its duration is $T_{sp} = 0.1327\alpha a^4$, which do not practically change for $\epsilon \ll 1$. In an exemplary embodiment, a=2 and $\alpha$ is chosen so that $T_{sp} = 4$ ms.

Axons (and PCs) are assumed not to be intercoupled, as observed experimentally, and receive excitation from IO neurons via the activation current $I_{jk}$. For simplicity, coupling between axons and neurons is assumed to be unidirectional and back propagation is ignored, assuming that a back pulse does not drastically change the membrane potential of an IO neuron and its neighboring neurons. The current $I_{jk}$ depends on the corresponding variable in the IO lattice. The simplest choice for this current is $I_{jk} = -I_0 + x_{jk}$ where $x_{jk} = \text{Re } z_{jk}$ and $I_0$ is a positive constant controlling the level of hyperpolarization. The system described by Eqs. 13a and 13b has its threshold at $I_{jk} = -a$. For $I_{jk} < -a$ there exist only small oscillations around the rest state with average membrane potential $\langle u_{jk} \rangle = -I_0$. However, if $I_{jk} > -a$, the variable $u_{jk}$ performs a large excursion to high values and comes back. The neuron thus produces spikes with amplitude $A_{sp}$ and duration $T_{sp}$.

The CN get excitatory signals from the corresponding axons and thus inhibit couplings in the IO lattice by decreasing IPSP for time intervals of about 30 ms. Accordingly, for the CN lattice 2130:

$$\tau w'_{jk} = w_{jk} + \Theta(u_{jk}) \quad (15)$$

where w is the variable representing the CN response, τ is the time scale of decay, and Θ is the sigmoidal (Boltzmann) function:

$$\Theta(u) = (\exp((u+I_0-0.6)/0.1)(1+\exp((u+I_0-0.6)/0.1))) \quad (16)$$

Without stimulus, $\Theta(u_{jk}) \approx 0 (u_{jk} = -I_0)$ and, consequently, the system (6) is in the rest state, $w_{jk}=0$. Each incoming spike switches-on the function $\Theta(u_{jk})$ for the period $T_{sp}$. This leads to an almost linear increase of $w_{jk}$ up to the value $T_{sp}/\tau$ and in turn $w_{jk}$ exponentially decays to the rest level. The duration of the resulting pulse at 0.7 height is about $\tau^* \ln(10/7)$. Such pulses have been observed experimentally to have durations of approximately 30 ms. As such, the value of τ is selected to be 0.08.

The pulse formed by the variable w reduces the electrical coupling in the vicinity of a given neuron in the IO lattice 2110. Thus for the coupling coefficients, $d^{lm}_{jk}$, in the system of Eq. 10, the following expression applies:

$$d^{lm}_{jk} = d^*(1+\Gamma \Sigma w_{pq})^{-1} \quad (17)$$

where d is the coupling coefficient in the absence of feedback and Γ reflects the decoupling strength. The summation is taken over neurons which can destroy the coupling between neurons (lm) and jk). As shown in FIG. 21, it is assumed that decoupling affects only four bonds. Thus, in the exemplary model, only two neurons, (lm) and (jk) can destroy the coupling (lm)–(jk).

The response of the axon lattice to sub-threshold oscillations in the IO lattice will now be described for the case in which there is no feedback loop. In this case, it is assumed that the value of electrical coupling between neurons in the IO lattice is constant and does not depend on the dynamics of the CN lattice, i.e., $d^{lm}_{jk}=d$ (i.e., Γ=0). Such a mode can be achieved experimentally by the blockage of GABA with picrotoxin or by the presence of lesions of the CN. Due to the assumed unidirectional coupling between the IO and axon lattices (i.e., no back propagation), the IO lattice can be thought of as the "master" lattice, made of diffusively coupled elements, that "slaves" the second lattice. It is expected that the noise will excite oscillations in the units in the master lattice which are uncorrelated for d=0, and becomes more and more correlated as the coupling coefficient increases. Consequently, due to the inter-lattice interaction, spike trains with a high level of coherence are obtained.

The modeling of the stochastic oscillations in the first lattice 2110 for different values of interneuron coupling, d, and the response of the slaved lattice to such activation will now be described. Clearly, for small intensity levels, the noise is able to excite only low amplitude oscillation. In the limit of fully uncoupled neurons, i.e., d=0, Eq. 10 yields n.times.n independent stochastic differential equations:

$$x''_{jk} + 2\gamma x'_{jk} + \Omega^2_0 x_{jk} = -w_0 \sqrt{2D} \xi_{jk} \quad (18)$$

where $\Omega_0 = (w^2_0 + \gamma^2)^{1/2}$. The noise intensity in this case is proportional to $w^2_0 D$. The fluctuation-dissipation theorem yields $T = w^2_0 D/4\gamma$, where T represents the noise "temperature."

The power spectrum of the stochastic process is:

$$S(w) = w^2_0 D/((w^2-w^2_0-\gamma^2)^2+4\gamma^2 w^2) \quad (19)$$

If $w_0 > \gamma$, the power spectrum has a peak at the frequency $w^2_{max} = w^2_0 - \gamma^2$ with height $$S(w_{max}) = D/4\gamma^2 \quad (20)$$

The case $\gamma \ll w_0$ corresponds to a narrow band process or quasi-monochromatic noise. The variables $x_{jk}$ exhibit fast random oscillations at a frequency around $w_0$ with slowly varying amplitude. Since the oscillators in the IO lattice are independent per Eq. 18, the normalized cross-correlation function $$C_x(R) = [<x_{jk}(t)x_{lm}(t)> - <x>^2]/\delta^2_x \quad (21)$$

has zero value for all R>0. Here $\delta_x$ is the standard deviation of the process x(t) and $R = [(j-l)^2+(k-m)^2]^{1/2}$ is the distance between oscillators (jk) and (lm). As such, it is possible to consider only one unit in Eq. 18 and its influence on the dynamics of the corresponding unit in the axon lattice (as represented by Eq. 13).

A system such as that described by Eqs. 13 and 18 is capable of generating both spikes and bursts of spikes. Moreover, spike trains reflect the structure of the underlying oscillations. Inter-spike interval (ISI) histograms show imperfect phase locking between ISIs and both the period of the fundamental oscillatory component and the time scale of the random modulation.

Figure 22A:
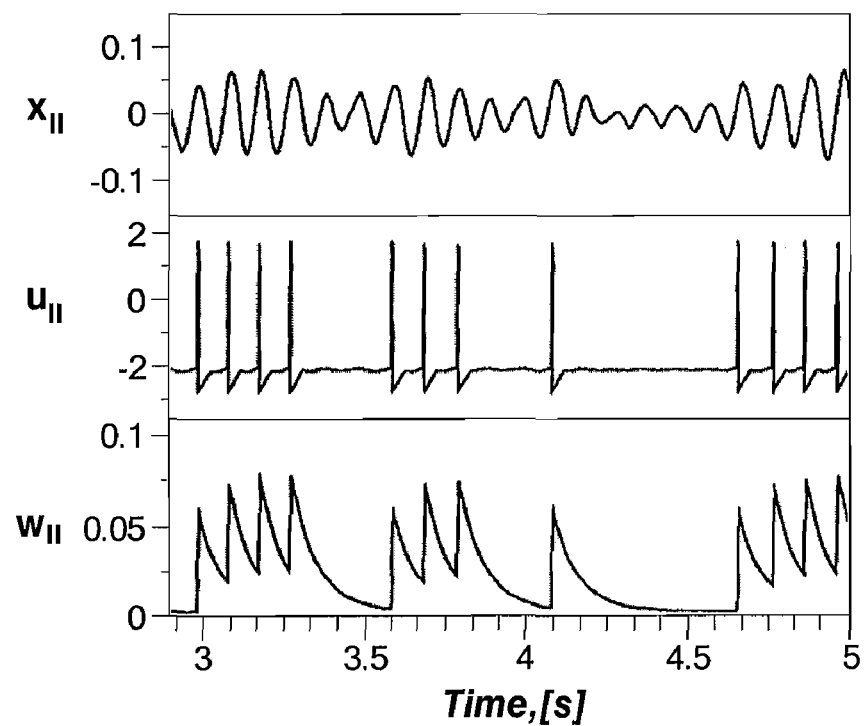
FIGS. 22A and B show the time domain responses of the IO, axon and CN neuron units of the exemplary model and the power spectrum of the quasi-harmonic oscillations of the IO units, respectively.

FIG. 22A show an exemplary time interval of the stochastic process x(t) for a unit of the IO lattice induced by noise and the responses of the corresponding units in the axon (u(t)) and CN lattices (w(t)). The signals shown in FIG. 22A are for the case in which IO units are uncoupled (d=0). As shown in FIG. 22A, the axon response, u(t), exhibits narrow ($T_{sp}=4$ ms) spiking oscillations which strongly depended on the process x(t). Namely, spikes in u(t) appear near maxima of x(t) when x(t) exceeds the threshold value in Eqs. 13. Thus, the stochastic process modeled by Eq. 18 brings rhythmicity to the firing of the axons and forces the axons to generate spikes with proper timing. In turn, the short spikes in the axon excite pulses with durations of approximately 30 ms in the corresponding unit in the CN lattice. If the spikes have a short ISI, then the variable w does not have time to recover. The next pulse starts from a nonzero amplitude and consequently has a higher peak.

Figure 22B:
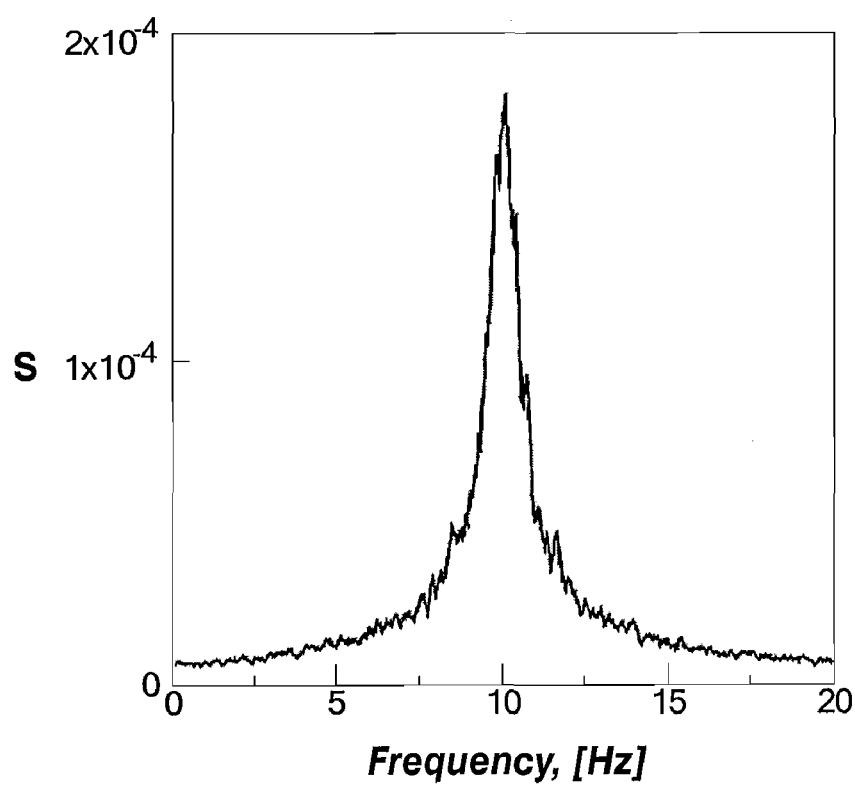

FIG. 22B shows the power spectrum of the quasi-monochromatic noise x(t). As shown in FIG. 22B, the power spectrum of the stochastic process x(t) has a well defined peak at the frequency 10 Hz. In the exemplary power spectrum shown, $w_0 = 2\pi^*10$, g=2, $I_0=2.03$, and D=0.003.

The results obtained for decoupled neurons suggest that for nonzero electrical coupling between units in the master (IO) lattice, IO neurons will be able to synchronize their oscillations and, consequently, initiate synchronous activity in the slaved (axon) lattice. However, the synchronization cannot be perfect due to the noisy origin of the oscillations. As such, imperfect synchronization of spike trains from different units in the axon lattice is expected. For d≠0, Eq. 18 yields:

$$x''_{jk} + 2\gamma x'_{jk} + \Omega^2_0 x_{jk} = 2d[(\Delta x')_{jk} + \gamma(\Delta x)_{jk}] - d^2(\Delta(\Delta x)_{jk})_{jk} - w_0\sqrt{2D}\xi_{jk}] \quad (22)$$

To simplify notation, the discrete Laplace operator is used:

$$(\Delta x)_{jk} = (\Delta x)_j + (\Delta x)_k$$

$$(\Delta x)_j = x_{j-1,k} - 2x_{jk} + x_{j+1,k}, \quad (23)$$

$$(\Delta x)_k = x_{j,k-1} - 2x_{jk} + x_{j,k+1}$$

Stochastic oscillations in the IO lattice (as described by Eq. 22) have a chance to synchronize for some time intervals due to the coupling terms in Eq. 22.

For the simple case in which the IO lattice contains only two units, substituting two new variables $s=x_2-x_1$, and $r=x_2+x_1$ into Eq. 22 yields:

$$s''+2(\gamma+2d)s'+(\Omega^2_0+4d\gamma)s=-2w_0\sqrt{D}\xi_s$$

$$r''+2\gamma r'+\Omega^2_0 r=-2w_0\sqrt{D}\xi_r \quad (24)$$

where $\xi_s=(\xi_2-\xi_1)/\sqrt{2}$, $\xi_r=(\xi_2+\xi_1)/\sqrt{2}$ are new independent noise sources with correlation function $<\xi_{s,r}(t)\xi_{s,r}(t-t')>=\delta(t-t')$. The Eqs. 24 are independent, and similar to the equation for a single unit (see Eq. 18). Using the power spectrum (Eq. 19) and assuming d=0, the following expressions are derived for x, r and s:

$$<x^2>=Dw^2_0/2\gamma\Omega^2_0,$$

$$<r^2>==Dw^2_0/\gamma\Omega^2_0, \quad (25)$$

$$<s^2>=Dw^2_0/(\gamma+2d)(\Omega^2_0+4d\gamma)$$

For high coupling values, the mean square displacement of the difference variable, s, tends to zero; i.e., oscillations in both units become synchronous. The standard deviation, i.e. the average amplitude of oscillations, for processes $x_1(t)$ and $x_2(t)$, which is the value $\delta_x=(<r^2>+<s^2>)^{1/2}/2$, is less than the standard deviation for a single unit and decreases as the coupling coefficient d increases. For large d, the standard deviation approaches the value $(<x^2>/2)^{1/2}$. Thus besides leading to synchronization, coupling terms in Eq. 24 act like additional damping and the resulting oscillations have lower mean amplitudes than for d=0. Using Eqs. 25, the cross-correlation function for processes $x_1(t)$ and $x_2(t)$ is as follows:

$$C_x=1-\gamma\Omega^2_0/(\Omega^2_0(\gamma+d)+2d\gamma(\gamma+2d)) \quad (26)$$

For $\Omega^2_0>>d$, Eq. 26 yields $C_x\approx 1-\gamma/(\gamma+d)$. Thus to have highly correlated oscillations for $x_1(t)$ and $x_2(t)$ it is necessary that $d>>\gamma$. Moreover, highly coherent spike trains for $u_1(t)$ and $u_2(t)$ also result.

Figure 23:
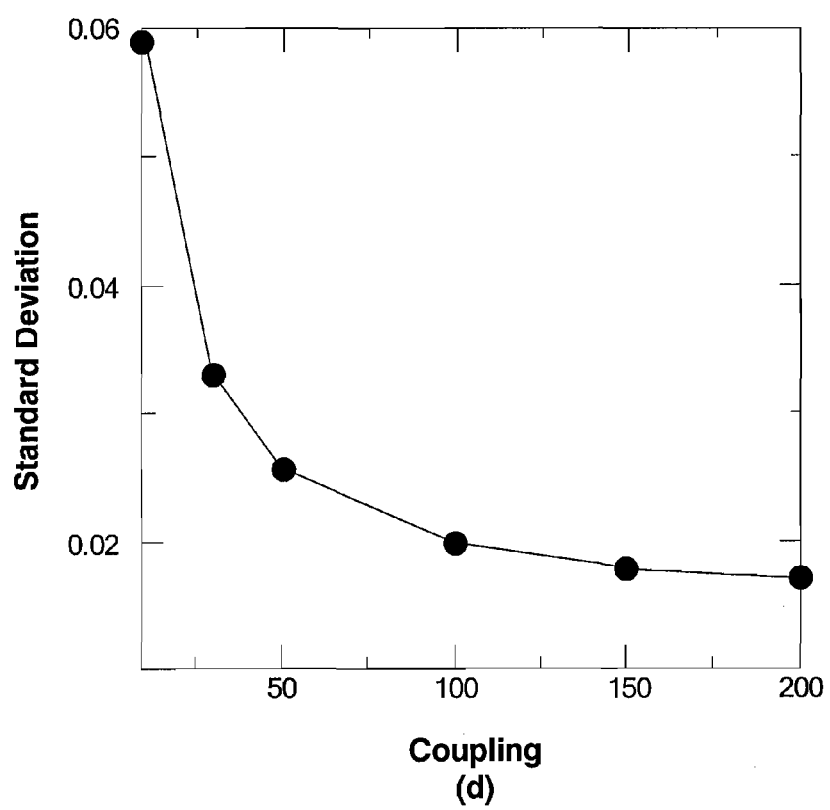
FIG. 23 is a graph of the standard deviation of oscillations of IO neurons as a function of the coupling coefficient between the IO neurons.

FIG. 23 shows the standard deviation of oscillations in the IO lattice (x(t)) as a function of the coupling coefficient d. As in the case of two units, the standard deviation decreases with increasing coupling d. However, due to the higher number of couplings and the collective dynamics in the lattice, the standard deviation of oscillations in the IO decays faster than for two units. The exemplary chart of FIG. 23 is for a fixed value of noise intensity D=0.2 in a 15×15 IO lattice with g=2 and $w_0=2\pi*10$.

The value of the average amplitude (standard deviation) affects the spiking activity of the slaved (axon) lattice. For higher values of $\sigma_x$, events such as $x_{jk}$ crossing the threshold $(I_0-a)$ in Eq. 13 become more probable. Consequently, spikes appear more frequently. For $I_0-a=\sigma_x$, the average number of spikes for a period of base oscillations of x(t) is approximately equal to ½.

Figure 24A:
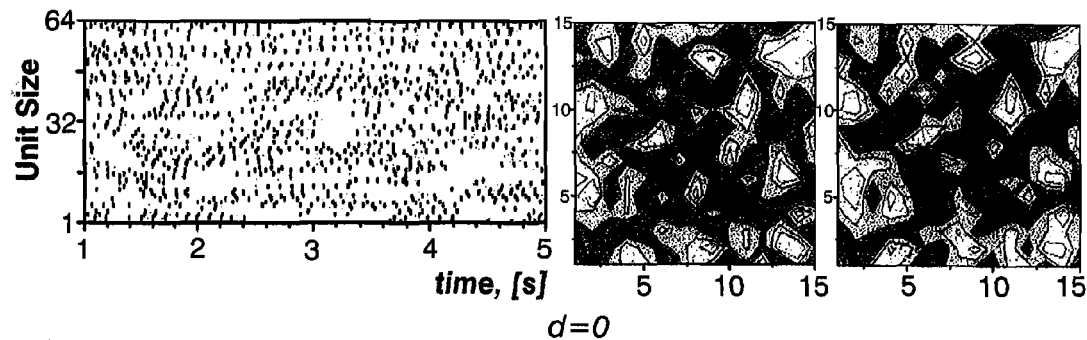
FIGS. 24A-C show the activity of the axons and IO neurons for three different values of IO neuron coupling.
Figure 24B:
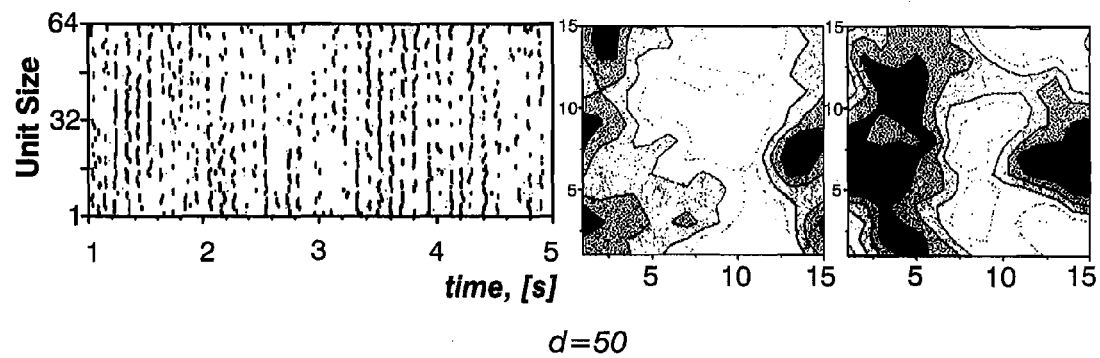
Figure 24C:
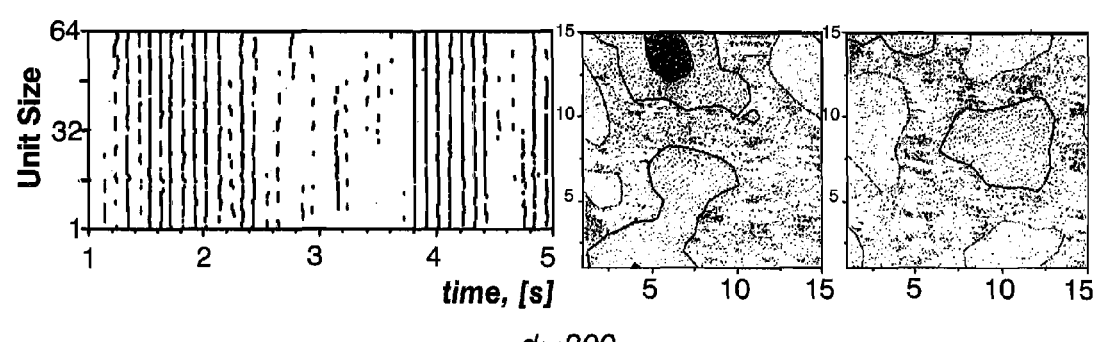

To avoid differences in spiking activity for different values of d, the noise intensity D=D(d) can be adjusted so that $\sigma_x$ remains constant. FIGS. 24A-C summarize the results of such computations. FIGS. 24A-C show the spatio-temporal evolution of activity in the axon lattice (raster display) and in the IO lattice (where gray intensity is proportional to the value of x) for an exemplary 15×15 system (with Dt=100 ms and with a fixed value of s=0.026.) Compared to the unsynchronized, low-conductance case for d=0, the oscillations in the IO lattice and in the axon lattice have a moderate level of coherence for d=50 and a high level of coherence for d=200.

For d=200 (FIG. 24C), almost all units in the IO lattice belong to a few temporal clusters in which elements oscillate together. Such clusters randomly drift over the lattice. Due to the synchronous oscillations in the IO, coherent spikes are observed in the axon lattice. Occasionally, however, the oscillation amplitudes drastically decrease and clusters break due to the phenomenon of phase resetting. This leads to silent behavior in the axon lattice during several periods (i.e., blank areas in the raster displays of FIGS. 24B and C). Units in the IO lattice then reorganize, their oscillation amplitudes grow and new spike trains appear in the axon lattice.

Figure 25A:
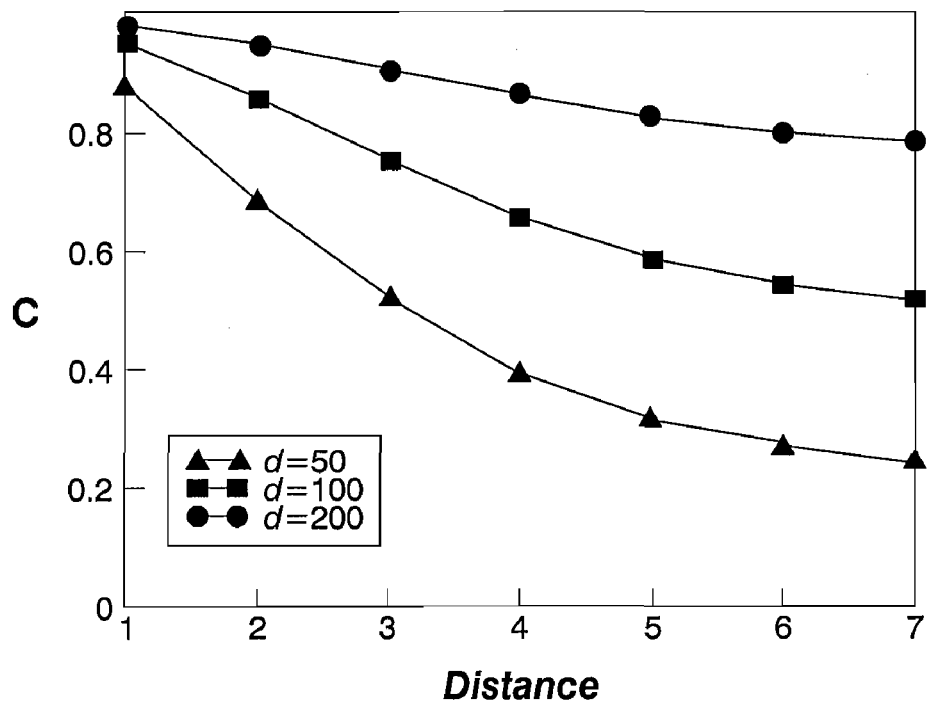
FIGS. 25A and B show cross-correlation values for several different values of coupling in the IO and axon lattices, respectively.

FIGS. 25A and B show cross-correlation values (per Eq. 21) for several different values of coupling in the IO and axon lattices, respectively. The distances on the x-axes of the graphs of FIGS. 25A and B are in terms of the number of neurons.

Figure 26A:
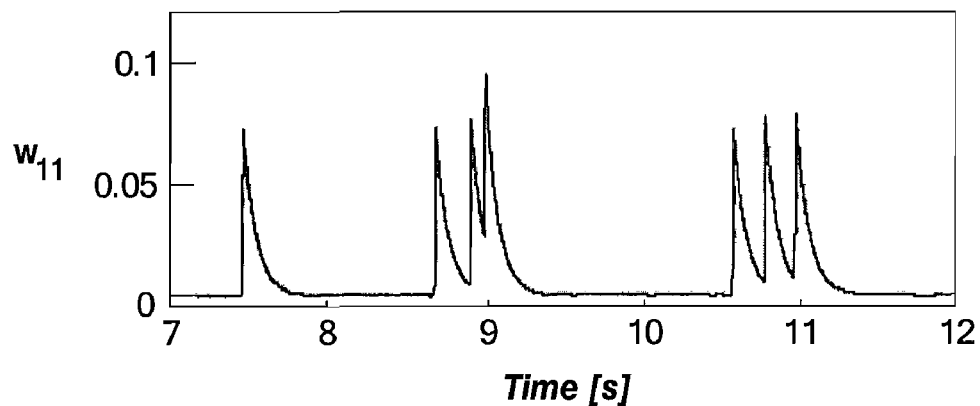
FIGS. 26A and B show exemplary pulse trains in two neighboring CN neurons activated by spikes from the axon lattice.
Figure 26B:
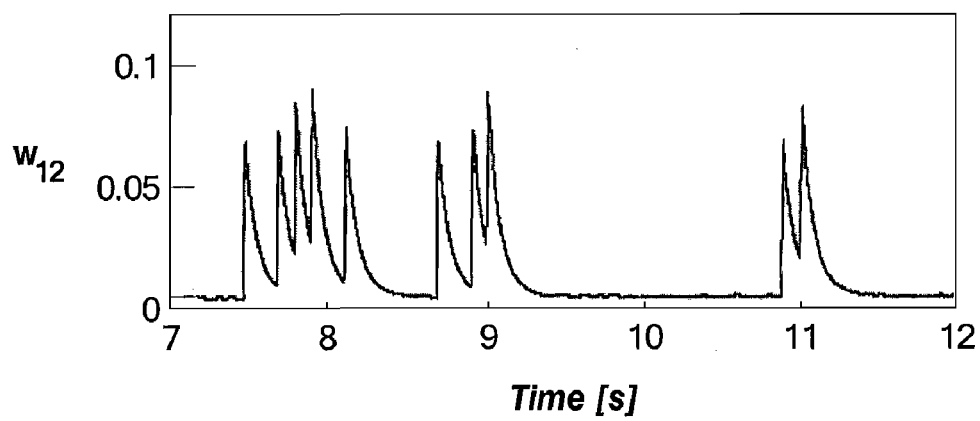
FIG. 26C shows the corresponding dynamics of the coupling coefficient between the affected IO neurons.
Figure 26C:
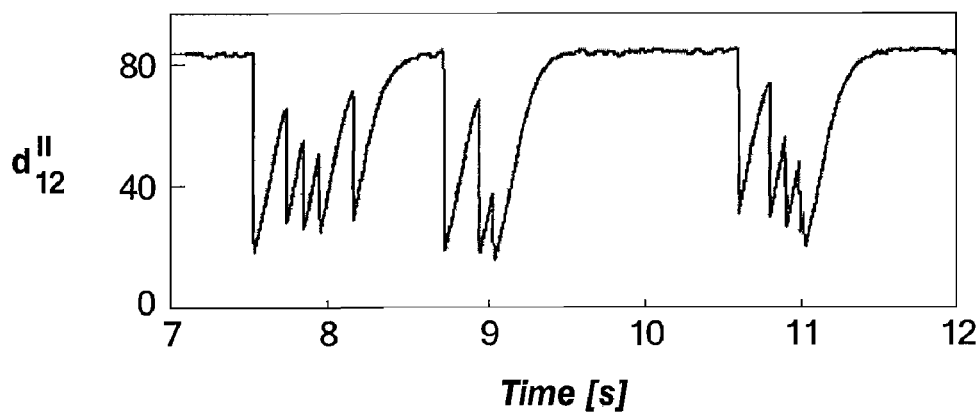

The behavior of the exemplary model of the present invention will now be described for the case in which the closed feedback loop is active (i.e., $\Gamma\neq 0$). In this case, the coupling coefficients between IO neurons are not constant. As discussed, the coupling between units in the IO lattice can be altered by the signals activated by the neurons, which are linked by this coupling. The signals pass via axons to CN neurons which in turn decrease the coupling coefficient per Eq. 17. FIGS. 26A and B show exemplary pulse trains in two neighboring CN neurons with indexes (11) and (12) activated by spikes from the axon lattice. FIG. 26C shows the corresponding dynamics of the coupling coefficient between the IO neurons with indexes (11) and (12). Each pulse reduces the coupling for the duration of the pulse. Thus the average coupling between IO neurons is shorter than for diminishing $\Gamma$, as discussed above. Consequently, the coherence level of oscillations in the IO layer and spike trains in the axon layer are smaller for the same parameters.

Figure 27A:
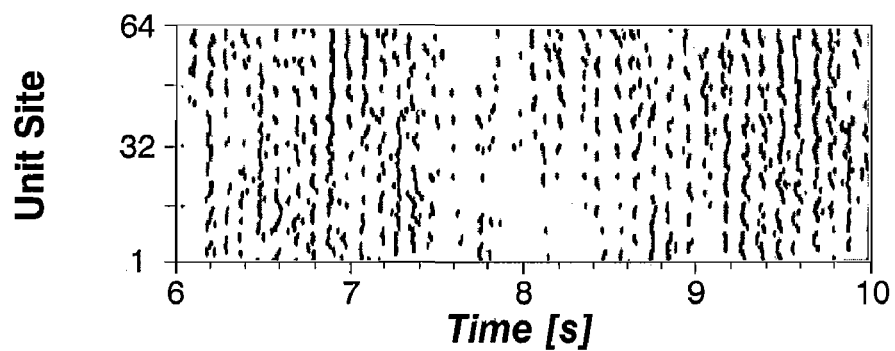
FIGS. 27A and B show two examples of spike trains in the axon layer.
Figure 27B:
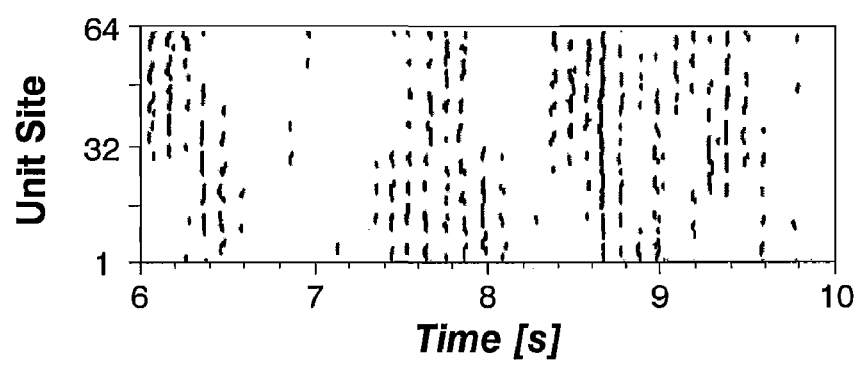
FIG. 27C shows cross-correlation functions for different values of hyperpolarizing current.
Figure 27C:
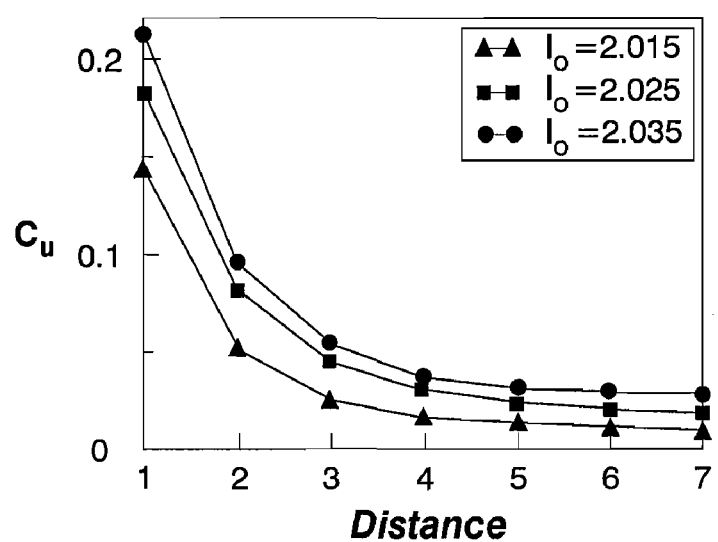

Besides the decoupling strength, $\Gamma$, the value of the hyperpolarizing current, $I_0$, will also significantly influence the dynamics of the system. It has been observed in experiments that injecting harmaline, which hyperpolarizes calcium conductance in IO neurons, leads to decreased spiking activity of PCs and axons (i.e., the average frequency of spike events is reduced), but spike trains become more coherent. The model of the present invention is able to mimic such behavior. FIGS. 27A and B show two examples of spike trains in the axon layer on the raster display while FIG. 27C shows cross-correlation functions for different values of $I_0$. As expected, the spiking activity (FIG. 27A) for a low level of hyperpolarization ($I_0=2.025$) is higher than the spiking activity (FIG. 27B) for a high level of hyperpolarization ($I_0=2.035$). Furthermore, as shown in FIG. 27C, the cross-correlation between units is lower for lower levels of hyperpolarization. This phenomenon is due to the fact that an increase of the hyperpolarizing level, $I_0$, leads to a decrease in the probability of the appearance of spikes in the axon lattice since this probability is a monotonically increasing function of $$\sigma_x-[I_0-a] \quad (27)$$

Figure 25B:
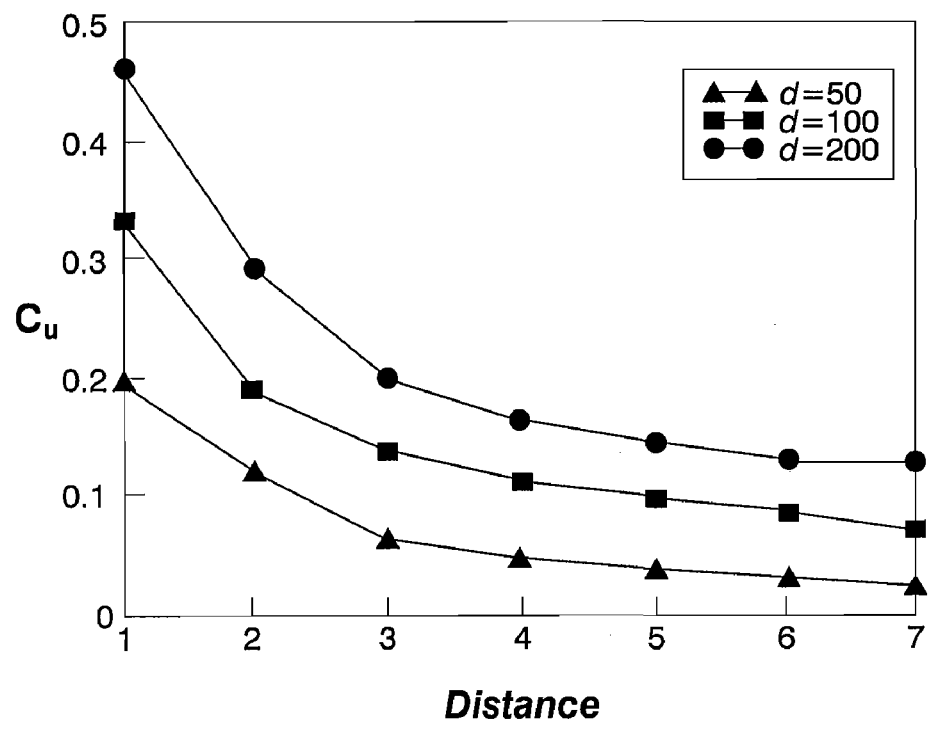

Thus the spiking activity decreases with increasing $I_0$ (down to zero for $I_0\rightarrow\infty$). Consequently, in the CN lattice, pulses formed by the spikes become rare thereby leading to higher mean values for the coupling coefficients in the IO lattice. Since the coherence level is higher for higher levels of coupling (see FIG. 25B), more correlated spike trains occur in the axon lattice. Furthermore, a higher level of coupling, due to its damping character, decreases the mean oscillation amplitude ($\sigma_x$), and the spiking activity further diminishes due to the term of Eq. 27. This process has a saturation value which is characterized by stationary oscillations with rare but more coherent spikes in the axon lattice.

Figure 28A:
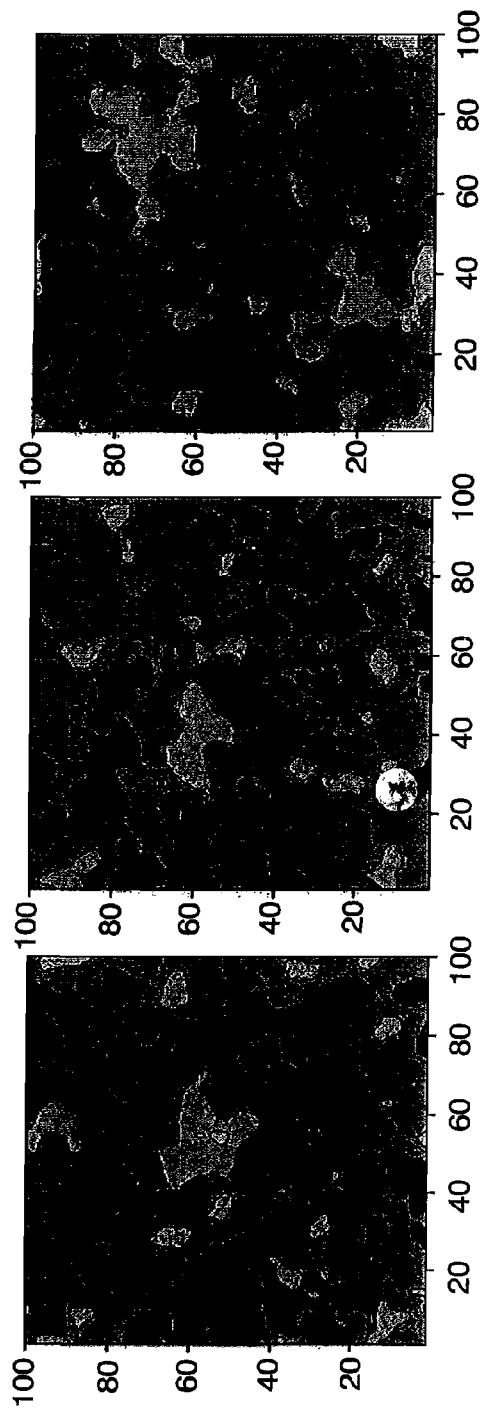
FIGS. 28A and B show several sequential snapshots of the oscillations in the IO lattice without feedback and with feedback, respectively.

For large systems (e.g., 100×100 lattices) it is possible to estimate the so-called Markov parameter β for the IO layer, thereby allowing comparison of the model to experimental observations. The Markov parameter estimates quantitatively how a given spatial distribution differs from a purely random distribution. If no statistically reliable difference exists, then β→0. FIGS. 28A and B show several sequential snapshots of the oscillations in the IO lattice without feedback (Γ=0) and with (Γ≠0) feedback, respectively.

Figure 28B:
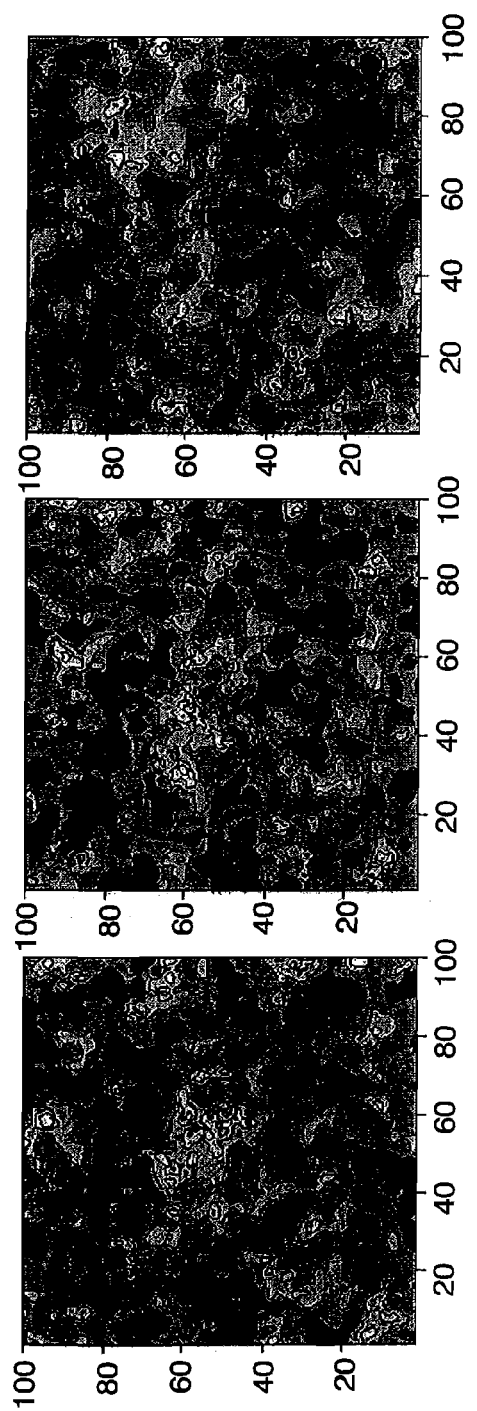
Figure 29A:
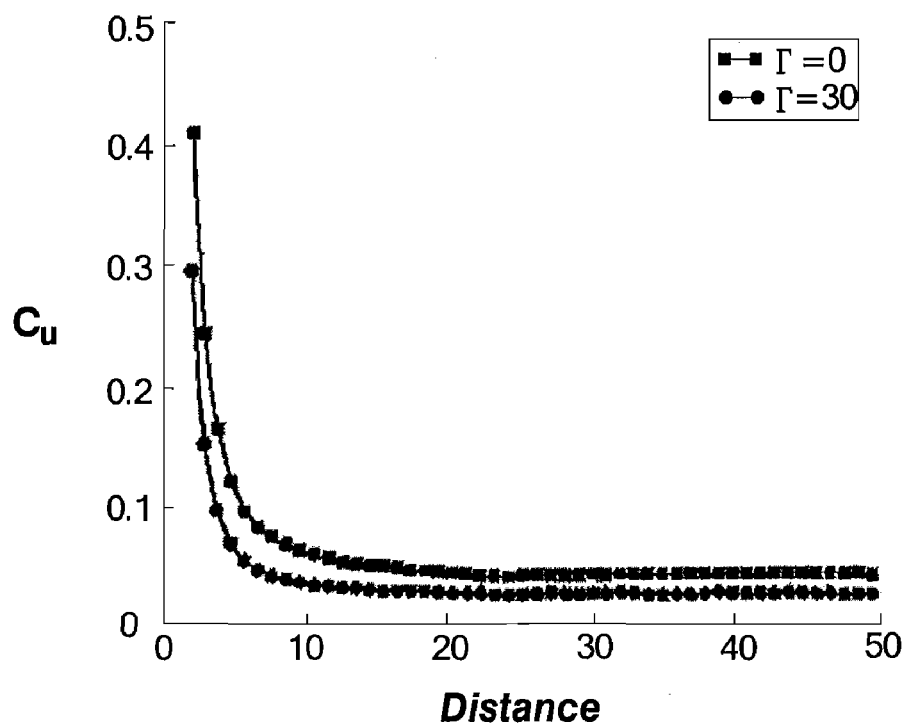
FIG. 29A illustrates the reduction in the length of coherence of spikes in the axon lattice shorter when the feedback loop is active.

In both cases, as a result of synchronization, clusters of neurons oscillating together are observed. These appear in FIG. 28 as areas of uniform gray intensity. The boundaries of the clusters change in time and clusters wander over the lattice. However, the average size of the clusters with feedback (Γ≠0) is smaller than with constant coupling. Furthermore, the boundaries between clusters are "clearer" (the gradient of gray is higher) in the case of feedback. This occurs due to the self-tuning of coupling between and inside clusters, which is impossible with a constant coupling coefficient (Γ=0). Generally, the coupling between units inside a cluster is stronger than between units at the boundary of clusters. Thus the feedback loop, via the CN lattice, reorganizes clusters in the IO lattice preventing their uncontrolled growth and making them "brighter". As shown in FIG. 29A, this phenomenon makes the length of coherence of spikes in the axon lattice shorter when the feedback loop is active.

Figure 29B:
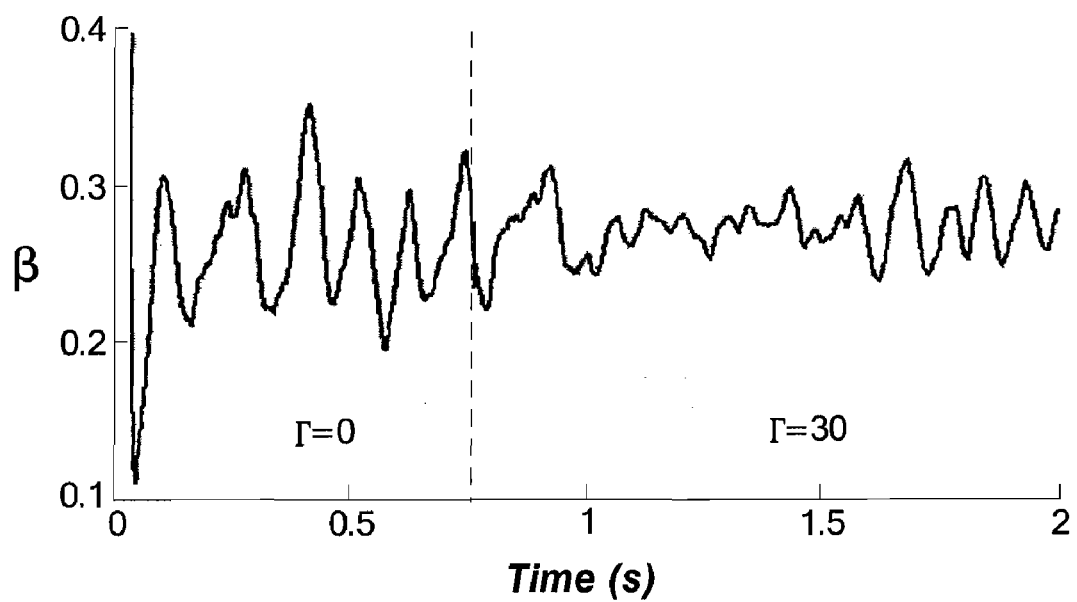
FIG. 29B shows how the Markov parameter is affected by feedback.

The Markov parameter, shown in FIG. 29B, reflects the important consequences of the negative feedback mechanism on the behavior of the system. At the first stage (before the dashed line) the intra-layer coupling is constant, Γ=0. At the second stage (after the dashed line) the feedback loop is switched-on and Γ=30. All parameters and conditions correspond to those of FIG. 28. As shown in FIG. 29B, the standard deviation of the Markov parameter is significantly less when the feedback is active. This means that the system is kept at a particular level of spatial organization with a specific number of degrees of freedom.

Universal Control System (UCS)

A Universal Control System (UCS) in accordance with the present invention, will now be described. An exemplary embodiment of a UCS of the present invention implements the cluster control principles of the olivo-cerebellar system described above in an electronic circuit network form. Using a set of input signals and a command, the UCS provides the on-line (intelligent) tuning of the parameters under control to execute a required action.

UCS Architecture

In an exemplary embodiment, the UCS of the present invention reproduces the key features of the motor control dynamics of the olivo-cerebellar system:
 (i) The UCS comprises parameter processing units that are robust oscillators generating spikes with precise timing τ (i.e., like IO neurons).
 (ii) Coupling among processing units provides phase synchronization among units, which coupling is influenced by inhibitory feedback. Variable clustering of units results.
 (iii) The UCS has an effective phase resetting mechanism that drives different cluster configurations at a rapid time scale (on the order of τ).
 (iv) The system reconfigures controlling clusters on command from sensory and motor signals.

Processing Unit Model and Hardware Implementation

As mentioned, an exemplary UCS in accordance with the present invention comprises multiple, inter-coupled parameter processing units, each of which mimics the behavior of an IO neuron. A first model of IO neuron behavior is described above. An alternate model will now be described. Although functionally equivalent to the first model, the second model generates subthreshold oscillations by appropriate parameter choice, in contrast with the Vander Pole oscillator in the first model. This model also provides a better fit of the experimental data from neurons and a faster response on stimulation. Both models can be used in the UCS of the present invention.

In accordance with the presently described model, the robust sub-threshold oscillations of each unit emerge from Andronov-Hopf bifurcation in the first state. The oscillatory signal goes to the second (excited) state which hovers up and down relative to a certain threshold. When reaching the threshold at the peak of the sub-threshold oscillation, the unit generates a spike. Spiking occurs with a timing defined by the sub-threshold oscillations. Depending on the values of the control parameters, the model qualitatively reproduces the spontaneous and stimuli-induced oscillations observed in IO neurons. These properties can be described by a mathematical model consisting of a set of four nonlinear differential equations:

$$\varepsilon_{Na}\frac{du}{dt} = f(u) - v;$$
$$\frac{dv}{dt} = u - (z - I_{Ca}) - I_{Na};$$
$$\frac{dz}{d(kt)} = f(z) - w;$$
$$\frac{dw}{d(kt)} = \varepsilon_{Ca}(z - I_{Ca}).$$

(30a, b, c, d)

The variables (z, w) describe the subthreshold oscillations and low-threshold ($Ca^{2+}$-dependent) spiking, whereas the variables (u, v) describe the higher-threshold ($Na^+$-dependent) spiking. The parameters $\varepsilon_{Ca}$ and $\varepsilon_{Na}$ control the oscillation time scales; $I_{Ca}$, $I_{Na}$ drive the depolarization level of the two blocks; $f$ is a cubic shape nonlinearity, $f(x)=x(x-a)(1-x)$; and the parameter k sets a relative time scale between the two blocks. The parameter a controls the shape of the spiking and the excitation threshold. With the values $\varepsilon_{Na}=0.001$; $\varepsilon_{Ca}=0.02$; k=10; $I_{Ca}=0.01$; $I_{Na}=-0.59$; and a=0.01, the model displays oscillations with the maximum spiking frequency (one spike per period).

As with the first exemplary model described above, this model can also be implemented in circuitry which mimics the behavior of an IO neuron. Given the large number of processing units that could be required in a UCS, the circuitry is preferably implemented using integrated circuit techniques. For example, each processing unit can be implemented as an integrated circuit. A plurality of these units can then be coupled together to form a UCS. In an even more integrated embodiment, a single integrated circuit can be formed comprising an array of intercoupled processing units. A UCS may comprise one or more such integrated circuits.

Inter-Unit Synchronization and Time Binding

As with IO neurons, where electrotonic coupling leads to phase synchronization, resistive coupling among the processing units of a UCS yields similar behavior. Also, as with IO neurons, inhibitory feedback is provided in which spike generation by a processing unit triggers a decoupling interval during which the unit is decoupled from neighboring processing units. The decoupling interval is approximately as long as a single oscillation period: i.e., $\tau_f \sim \tau$.

During a decoupling interval, the unit operates autonomously and it may modify its phase to compensate for a control discontinuity, or it may reset its phase in accordance with incoming stimuli. This is a property of each processing unit that lends functional flexibility to the controller comprising said units.

Figure 30A:
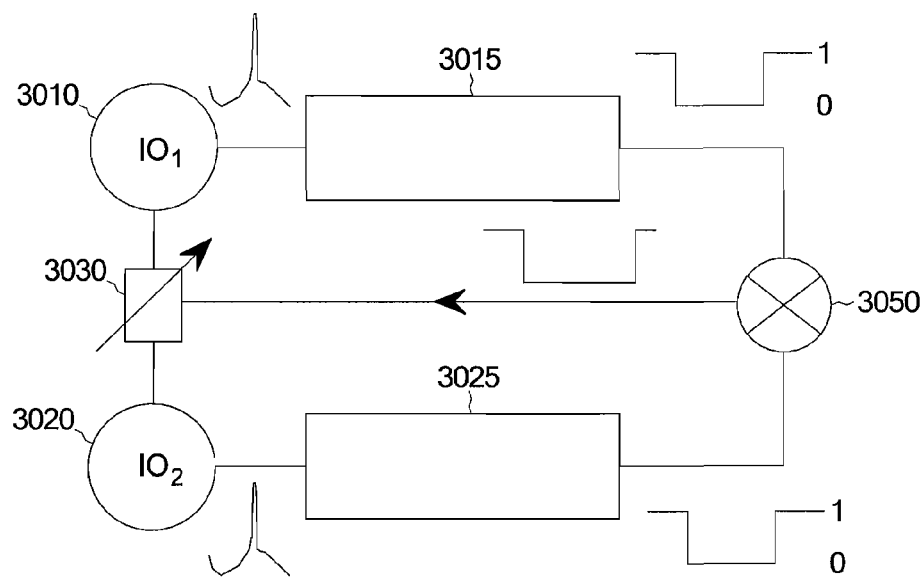
FIG. 30A illustrates two processing units with feedback controlled coupling.

An exemplary embodiment of a feedback circuit is schematically shown in FIG. 30A. The circuit of FIG. 30A includes two processing units 3010, 3020, which can each be implemented with the circuitry described above. A logical timing block 3015 is coupled to the output of the unit 3010 and a logical timing block 3025 is coupled to the output of the unit 3020. Each of the logical timing blocks 3015 and 3025 generates a pulse of duration $\tau$ in response to a spike at its input. The logical timing blocks 3015 and 3025 can be implemented with "one-shot" pulse generators. A logic element 3050 combines the pulses generated by the logical timing blocks 3015 and 3025 to generate a pulse which combines the durations of the pulses generated by the logical timing blocks. In the exemplary embodiment shown, the logical timing blocks 3015 and 3025 generate logic LOW (or 0) pulses and the logic element 3050 performs a logic AND function. As can be readily appreciated, alternatively, logic HIGH pulses can be generated and the logic element 3050 can perform a logic OR operation.

The output of the logic element 3050 is used to control a variable coupling element 3030 which couples the processing units 3010 and 3020. During the output pulse of the logic element 3050 (i.e., while the output of the element 3050 is low in the exemplary embodiment shown), the variable coupling element 3030 causes the units 3010 and 3020 to be decoupled by taking on a high impedance. To couple the units 3010 and 3020, the variable coupling element 3030 takes on a low impedance. The variable coupling element 3030 can be implemented with an analog switch or the like.

As can be seen from FIG. 30A, if the processing units 3010 and 3020 fire asynchronously, a decoupling period longer than $\tau$ is generated. The outcome of such spike-controlled coupling is the possibility of time binding. Oscillations from neighboring units can be highly synchronized during certain time windows providing coherence to the controlled signals (e.g., muscle activity). Between the coherent states, the processing units can reconfigure themselves to be tuned for another template.

Figure 30B:
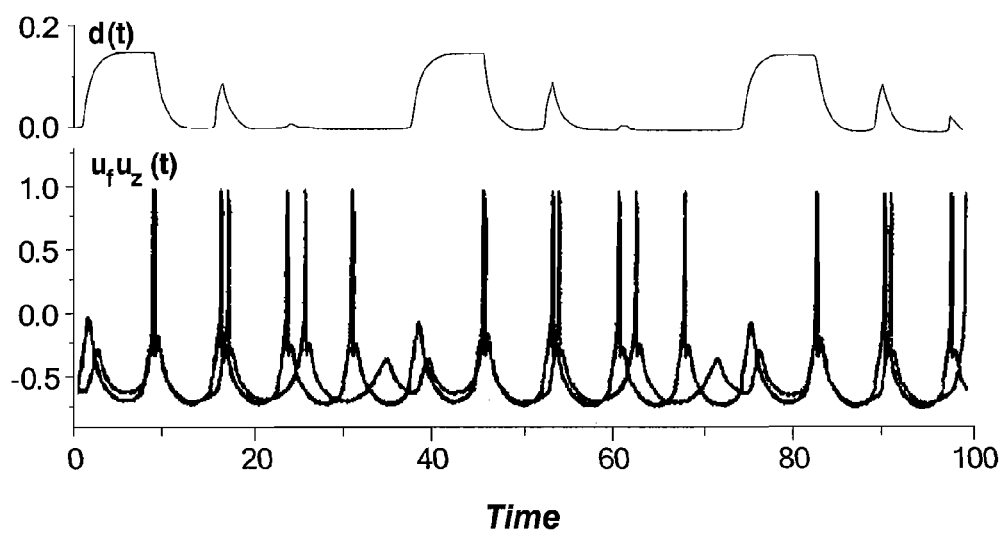
FIG. 30B illustrates the coupling and synchronization of the processing units of FIG. 30A.

The inhibitory feedback mechanism represented in FIG. 30A can also be simulated using the above-described IO neuron model. FIG. 30B illustrates the windows of synchronization as modelled with a pair of processing units with inhibitory feedback. d(t) represents the coupling between the two units and $u_1(t)$ and $u_2(t)$ are the respective outputs of the units.

Cluster Control Architecture (CCA) in a Controller with N Processing Units

The oscillatory units in the olivo-cerebellar network are locally coupled. Each IO neuron can influence about 50 neighboring neurons. Moreover, the coupling inhibiting feedback signal generated as a function of the spiking activity of an IO neuron can be assumed to influence the IO neuron and its neighbors (as opposed to influencing IO neurons in other parts of the IO). Using such local grouping the system is capable of maintaining local oscillatory coherence and can tune neighboring unit rhythmicity. This parallel processing feature is significant when a local group of IO neurons controls a certain parameter or a group of parameters closely linked to each other. The global coherence which yields a particular motor template is determined by the input stimuli and the sensory and motor feedback from the executing system (i.e., the muscles). The result is a stimuli-induced configuration of phase clusters formed in a certain time window.

Figure 31A:
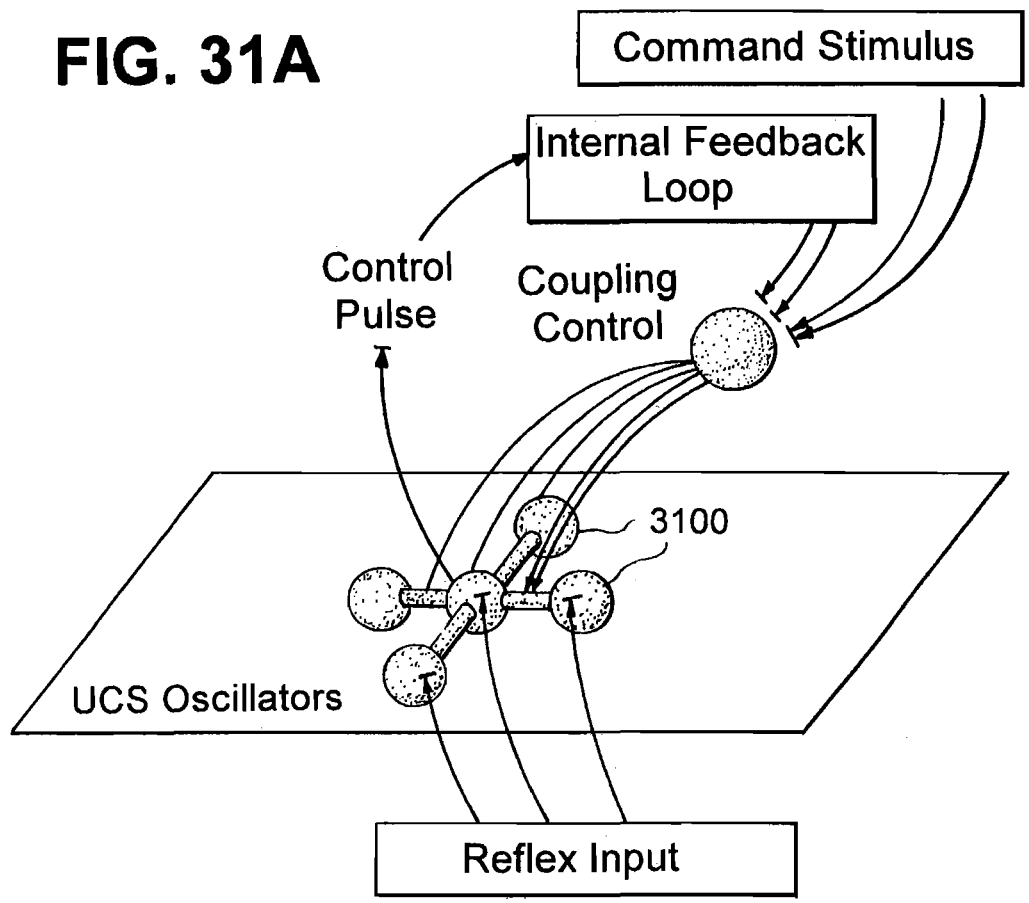
FIG. 31A illustrates an exemplary embodiment of a Universal Control System (UCS) in accordance with the present invention.
Figure 31B:
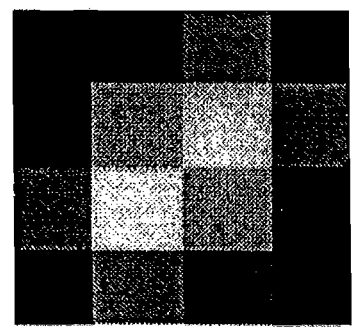
FIG. 31B shows an exemplary motor pattern as a stimulus for the UCS of FIG. 31A.

FIG. 31A shows a schematic representation of an exemplary embodiment of a UCS in accordance with the present invention. FIG. 31B shows an exemplary motor pattern taken as a command stimulus for the UCS of FIG. 31A. The individual pixels within the motor pattern represent the phases of oscillation of individual processing units arranged in an array. The darkness of each pixel is indicative of the oscillation phase of the corresponding processing unit.

As shown in FIG. 31A, a UCS with N processing units 3100, can be thought of as comprising a layer of N units organized in multiple groups of five with each group comprising four spike-controlled, variable coupling connections between a central unit and four adjacent units. Only one such group is shown in FIG. 31A for clarity.

The layer of processing units 3100 receives two types of inputs. The first type, command stimuli, act to inhibit the inter-unit coupling according to a given template (pre-motor pattern). In an actual olivo-cerebellar system, this type of input acts through the cerebellar nuclei, as discussed above. The second type of inputs to the layer of processing units 3100 includes motor feedback signals which directly stimulate the processing units to "report" the current state of the executing system. Combining the inputs, the UCS generates an optimal motor execution pattern for a given command from the current state of the executing system.

Given a command input, the UCS would provide a pool of pre-motor patterns suitable for command execution. Like the human brain, the UCS maintains a set of automatic commands with known, fixed action patterns which can be modified as needed. A command input to the UCS of the present invention is analogous to a cerebellar cortical input to an actual olivo-cerebellar system which input would act to modify the gap junctions between the IO neurons via cerebellar nuclear activity. Accordingly, a cerebellar cortical input would result in the increase or decrease of the electrotonic coupling among clusters of IO neurons resulting in a suitable space configuration. Because the processing units of the UCS have their synchronization tuned with the feedback loop, there is no need to set all the connections. The system need use only the key features of the input pattern. For example, in the motor pattern shown in FIG. 31B, the system requires only the pattern contours separating different levels of intensity. In other words, the UCS does not require that the patterns be perfect. Rather, the borders of the clusters constituting the pattern are what is critical. Thus if some elements of a particular cluster in the pattern were to fall out of synchronization with the rest of the pattern, the system's performance would not be affected.

Figure 32A:
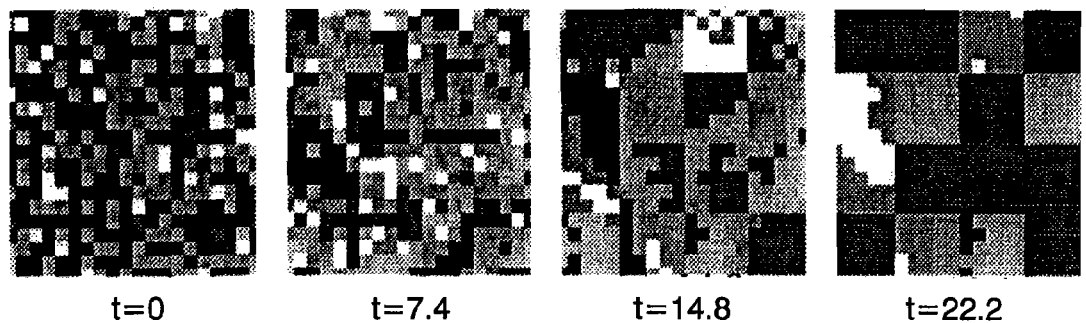
FIGS. 32A and 32B show a sequence of pre-motor patterns of the response of the UCS of FIG. 31A to a command stimulus.
Figure 32B:
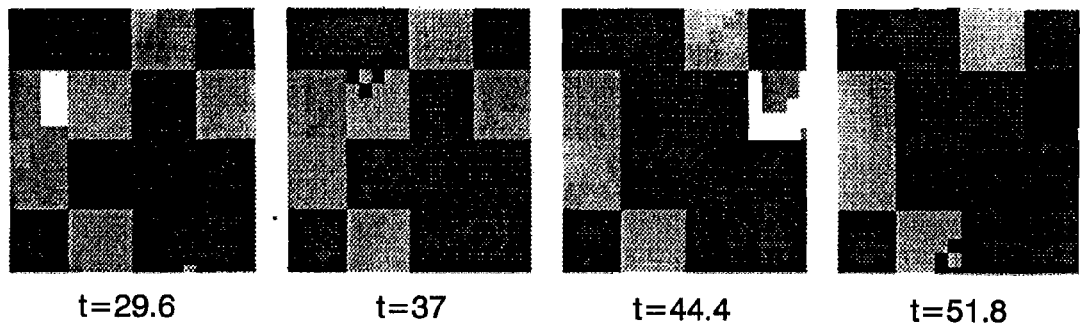

A sequence of pre-motor patterns obtained by simulation with such conditions is illustrated in FIGS. 32A and 32B. The network organizes itself into a square configuration of clusters corresponding to the stimulus. At variance with pattern formation in the gradient (Hopfield) neural network that needs to define for a given pattern all possible $N^2$ inter-unit connections (Hebbian learning rule), by contrast, the UCS needs only a few percent of this value modified, avoiding possible overloads. In the chessboard pattern example a UCS comprising 400 processing units uses $\sim 10^2$ couplings from $1.6 \times 10^4$ possibilities. Note also that the phase difference between the clusters is not fixed and depends on the initial (previous) state of the system. Thus for a given stimulus, the UCS yields a pool of possible cluster configurations. Because the system does not require a fixed phase difference between clusters, nor perfect synchronization among the elements within a particular cluster, the number of possible patterns that are satisfactory for an imposed template provides a pool of possible solutions.

Figure 32C:
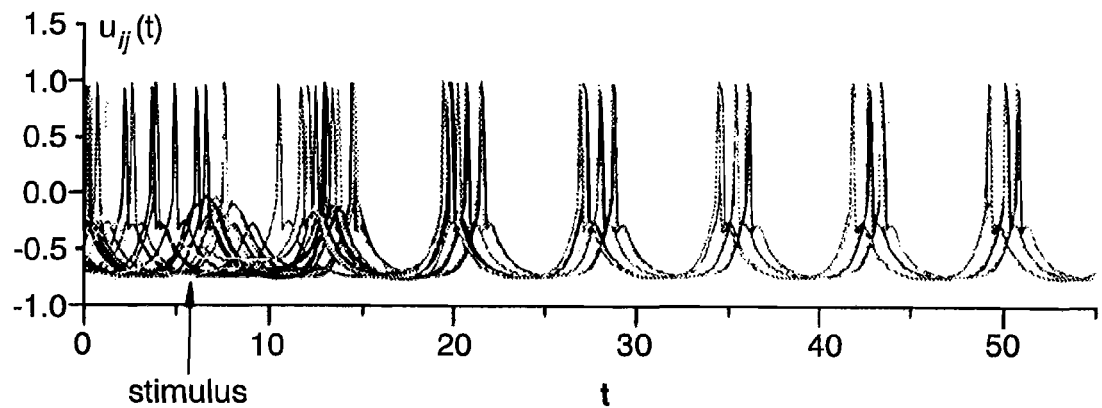
FIG. 32C shows the corresponding spiking activity of the UCS.
Figure 33A:
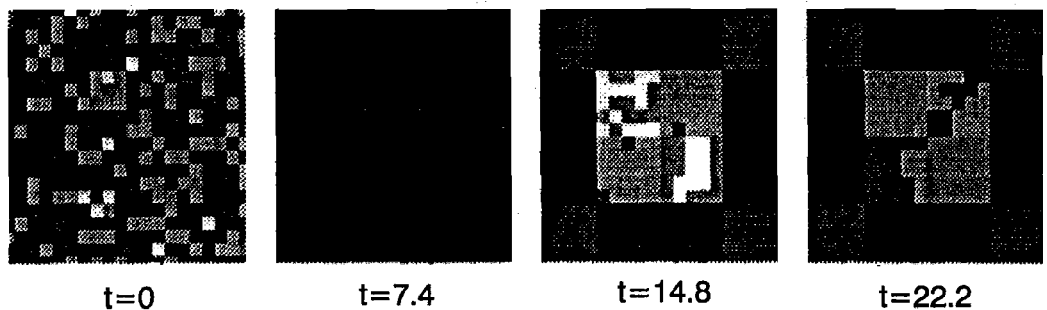
FIGS. 33A and 33B show a sequence of pre-motor patterns of the response of the UCS of FIG. 31A to a command stimulus.
Figure 33B:
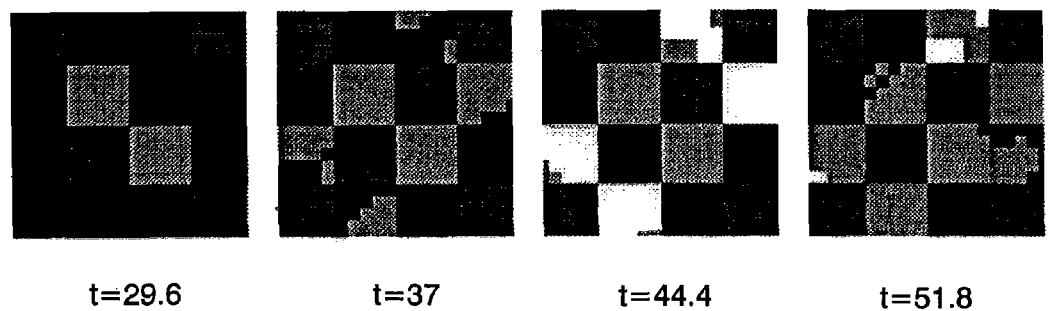
Figure 33C:
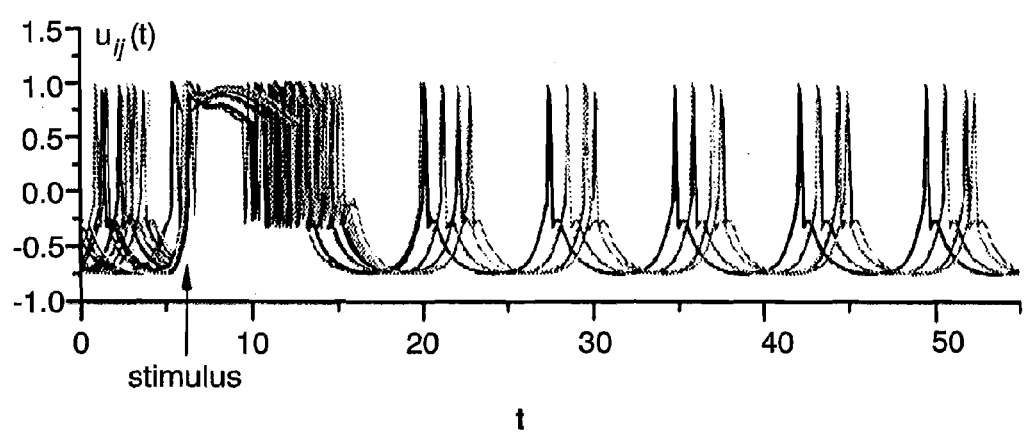

To provide global coherence, the UCS organizes the clusters according to the current state of the executing system (e.g., muscles, actuators). For this purpose, the UCS uses the second type of input (e.g., executing system feedback) to reset the phase differences among clusters. The motor feedback inputs go directly to the oscillatory units. In the unit model (Eqs. 30a-d), a stimulus resets the unit's oscillation phase to a value corresponding to the duration and the magnitude of the input signal. Thus UCS unit network activation with different magnitudes associated with different levels of intensity of the motor pattern (FIG. 31B) results in the required synchronism between the clusters (FIGS. 32A-C). Note that the UCS processes both types of inputs quite rapidly, updating the clusters on the time scale $\tau$.

The UCS of the present invention is applicable to a very large set of control requirements. The UCS does not demand specification of the parameters under control and has no restriction on the number of the parameters to be tuned together. Such universality makes possible a wide range of applications. For instance, the UCS of the present invention can be used in robotic applications such as the six-legged walker described above. The UCS is capable of simultaneously solving the problems of stability and adaptability.

Indeed, given any device to be controlled, the UCS must be supplied with the input-output connectivity providing the interface between the parameter under control and the phase of UCS's oscillatory unit.

Processing Power of the UCS

The computing power of the UCS of the present invention is substantially greater than can be implemented with a digital computer. In contrast to existing controllers (mostly based on digital computing systems) the UCS of the present invention does not operate numerically but rather works by internally emulating a large set of possible solutions to a given task. Given N parameters to be controlled, the UCS would include at least the same number of processing units; i.e., a processing unit is provided for each parameter.

For each timing interval $\tau$, the UCS would process N! possible combinations of different parameter states. In digital processing terms, the upper limit of the UCS computing power would thus be:

$$P(\tau) \sim \frac{N!}{\tau} \quad (28)$$

For instance, for N=20 and $\tau$=0.1 s, this value would be more than $10^9$ GHz. Moreover, in the UCS, the timing interval $\tau$ can be substantially decreased down to the limits of the hardware.

Another estimation of the processing power of the UCS is as follows. If M is the number of states that can be resolved by the system for each of N parameters, the UCS would process $M^N$ possible combinations of different parameter states every timing interval $\tau$. Thus, in digital processing terms, the upper limit of the UCS computing power would be:

$$P(\tau) \sim \frac{M^N}{\tau} \quad (29)$$

In the olivo-cerebellar system, the precision of spike synchrony, hence the time resolution, is very high. Experiments show that spikes associated with the same oscillatory cluster occur in about a 1 ms time window. Thus, the number of possible states M in a 100 ms period can be estimated to be ~100. Note that in the UCS, the timing interval $\tau$ can be substantially decreased down to the processing limits of the system.

The methods and apparatus of the present invention have broad applicability to a wide variety of applications, including among others: robotics, for the adaptive control and organization of movement; distributed dynamic systems, such as traffic control, control of distribution over power grids, warehouse storage control; environmental control; and balance control for static and dynamic structures.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

It is further to be understood that all values are to some degree approximate, and are provided for purposes of description.

Patents, patent applications, and publications are cited throughout this application, the disclosures of which are incorporated herein by reference in their entireties.

What is claimed is:

1. A control system comprising:
   a plurality of control circuits, each control circuit comprising the following elements:
   an input receiving connection for receiving an input signal;
   an oscillation generation circuit for generating at a first output terminal an oscillation output signal having an amplitude, phase and a frequency;
   a first spike generation circuit in communication with the oscillation generation circuit for generating a first spike signal when the oscillation output signal crosses a first threshold value, the first spike signal being provided at the first output terminal;
   a second spike generation circuit in communication with the oscillation generation circuit for generating a second spike signal when the oscillation output signal crosses a second threshold value, the second spike signal being provided at the first output terminal;
   wherein the oscillation output signal, the first spike signal and the second spike signal collectively form a composite output signal which is capable of controlling an actuating element, and wherein characteristic information of the actuating element is provided as part of the input signal to the control circuit to thereby adjust one of the amplitude, phase and frequency of the oscillation output signal.

2. The control system of claim 1, wherein a phase characteristic of the composite output signal of a first control circuit is maintained at a predetermined level relative to a phase characteristic of the composite output signal of a second control circuit.

3. The control system of claim 1, further comprising at least one coupling element for coupling adjacent control circuits.

4. The control system of claim 3, wherein the coupling element comprises a variable impedance element.

5. The control system of claim 1, further comprising a plurality of coupling elements, each coupling element connected to two adjacent control circuits to thereby provide coupling between the two adjacent control circuits.

6. The control system of claim 5, wherein the impedance of the coupling elements is altered to thereby modify synchronization between coupled control circuits.

7. The control system of claim 1, further comprising a command input for controlling the coupling between control circuits.

8. The control system of claim 1, further comprising a first cluster of control circuits and a second cluster of control circuits, the first cluster of control circuits being characterized by a higher degree of coupling between control circuits of the first cluster relative to a lower degree of coupling between control circuits of the first cluster and control circuits of the second cluster.

9. The control system of claim 1, wherein the first spike generation circuit generates the first spike signal at a peak of the oscillation output signal.

10. The control system of claim 1, wherein the first spike signal and the second spike signal have different amplitudes.

11. A control system comprising:
a plurality of control circuits, each control circuit comprising the following elements:
an input receiving connection for receiving an input signal;
an oscillation generation circuit for generating at a first output terminal and a second output terminal an oscillation output signal having an amplitude, phase and a frequency;
a first spike generation circuit in communication with the oscillation generation circuit for generating a first spike signal when the oscillation output signal crosses a first threshold value, the first spike signal being provided at the first output terminal and the second output terminal;
a second spike generation circuit in communication with the oscillation generation circuit for generating a second spike signal when the oscillation output signal crosses a second threshold value, the second spike signal being provided at the first output terminal;
wherein the oscillation output signal, the first spike signal and the second spike signal collectively form a first composite output signal at the first output terminal, and the oscillation output signal and the first spike signal collectively form a second composite output signal at the second output terminal, such that at least one of the composite output signals is capable of controlling an actuating element, and wherein characteristic information of the actuating element is provided as part of the input signal to the control circuit to thereby adjust one of the amplitude, phase and frequency of the oscillation output signal.

12. The control system of claim 11, wherein a phase characteristic of the composite output signal of a first control circuit is maintained at a predetermined level relative to a phase characteristic of the composite output signal of a second control circuit.

13. The control system of claim 11, further comprising at least one coupling element for coupling adjacent control circuits.

14. The control system of claim 13, wherein the coupling element comprises a variable impedance element.

15. The control system of claim 11, further comprising a plurality of coupling elements, each coupling element connected to two adjacent control circuits to thereby provide coupling between the two adjacent control circuits.

16. The control system of claim 15, wherein the impedance of the coupling elements is altered to thereby modify synchronization between coupled control circuits.

17. The control system of claim 11, further comprising a command input for controlling the coupling between control circuits.

18. The control system of claim 11, further comprising a first cluster of control circuits and a second cluster of control circuits, the first cluster of control circuits being characterized by a higher degree of coupling between control circuits of the first cluster relative to a lower degree of coupling between control circuits of the first cluster and control circuits of the second cluster.

19. A robotic control system comprising:
a plurality of control circuits, each control circuit comprising the following elements:
an input receiving connection for receiving an input signal;
an oscillation generation circuit for generating at a first output terminal an oscillation output signal having an amplitude, phase and a frequency;
a first spike generation circuit in communication with the oscillation generation circuit for generating a first spike signal when the oscillation output signal crosses a first threshold value, the first spike signal being provided at the first output terminal;
a second spike generation circuit in communication with the oscillation generation circuit for generating a second spike signal when the oscillation output signal crosses a second threshold value, the second spike signal being provided at the first output terminal;
wherein the oscillation output signal, the first spike signal and the second spike signal collectively form a composite output signal which is capable of controlling an actuating element, and wherein a sensor is used to obtain characteristic information of the actuating element such that the characteristic information is provided as part of the input signal to the control circuit to thereby adjust one of the amplitude, phase and frequency of the oscillation output signal; and
further wherein the input signal is used to synchronize controlled movement of the actuation elements.

20. A method of controlling a system comprising the following steps:
using a plurality of control circuits, each control circuit performing the following steps:
receiving an input signal at an input receiving connection;
generating at a first output terminal an oscillation output signal having an amplitude, phase and a frequency;
generating a first spike signal when the oscillation output signal crosses a first threshold value, the first spike signal being provided at the first output terminal;
generating a second spike signal when the oscillation output signal crosses a second threshold value, the second spike signal being provided at the first output terminal;
wherein the oscillation output signal, the first spike signal and the second spike signal collectively form a composite output signal which is capable of controlling an actuating element, and further comprising the step of obtaining characteristic information of the actuating element which is provided as part of the input signal to the control circuit to thereby adjust one of the amplitude, phase and frequency of the oscillation output signal.

21. The method of claim 20, wherein a phase characteristic of the composite output signal of a first control circuit is maintained at a predetermined level relative to a phase characteristic of the composite output signal of a second control circuit.

22. The method of claim 20, further comprising the step of using at least one coupling element for coupling adjacent control circuits.

23. The method of claim 22, wherein the coupling element comprises a variable impedance element.

24. The method of claim 20, further comprising the step of using a plurality of coupling elements, each coupling element connected to two adjacent control circuits to thereby provide coupling between the two adjacent control circuits.

25. The method of claim 24, further comprising the step of altering the impedance to thereby modify synchronization between coupled control circuits.

26. The method of claim 20, further comprising the step of applying a command input for controlling the coupling between control circuits.

27. The method of claim 20, further comprising the step of creating a first cluster of control circuits and a second cluster of control circuits, the first cluster of control circuits being characterized by a higher degree of coupling between control circuits of the first cluster relative to a lower degree of coupling between control circuits of the first cluster and control circuits of the second cluster.

28. A method of controlling a system comprising the following steps:
using a plurality of control circuits, each control circuit performing the following steps:
receiving an input signal at an input receiving connection;
generating at a first output terminal and at a second output terminal an oscillation output signal having an amplitude, phase and a frequency;
generating a first spike signal when the oscillation output signal crosses a first threshold value, the first spike signal being provided at the first output terminal and the second output terminal;
generating a second spike signal when the oscillation output signal crosses a second threshold value, the second spike signal being provided at the first output terminal;
wherein the oscillation output signal, the first spike signal and the second spike signal collectively form a composite output signal at the first output terminal, and the oscillation output signal and the first spike signal collectively form a second composite output signal at the second output terminal, such that at least one of the composite output signals is capable of controlling an actuating element, and further comprising the step of obtaining characteristic information of the actuating element which is provided as part of the input signal to the control circuit to thereby adjust one of the amplitude, phase and frequency of the oscillation output signal.

29. The method of claim 28, wherein a phase characteristic of the composite output signal of a first control circuit is maintained at a predetermined level relative to a phase characteristic of the composite output signal of a second control circuit.

30. The method of claim 28, further comprising the step of using at least one coupling element for coupling adjacent control circuits.

31. The method of claim 30, wherein the coupling element comprises a variable impedance element.

32. The method of claim 30, further comprising the step of using a plurality of coupling elements, each coupling element connected to two adjacent control circuits to thereby provide coupling between the two adjacent control circuits.

33. The method of claim 32, further comprising the step of altering the impedance to thereby modify synchronization between coupled control circuits.

34. The method of claim 28, further comprising the step of applying a command input for controlling the coupling between control circuits.

35. The method of claim 28, further comprising the step of creating a first cluster of control circuits and a second cluster of control circuits, the first cluster of control circuits being characterized by a higher degree of coupling between control circuits of the first cluster relative to a lower degree of coupling between control circuits of the first cluster and control circuits of the second cluster.

* * * * *